US010697361B2

(12) United States Patent
Genin et al.

(10) Patent No.: US 10,697,361 B2
(45) Date of Patent: Jun. 30, 2020

(54) LINKAGE FOR EXHAUST BYPASS VALVE OF MULTI-STAGE TURBOCHARGER

(71) Applicant: Garrett Transportation I Inc., Torrance, CA (US)

(72) Inventors: Emeric Genin, Jarville (FR); Marylene Ruffinoni, Uxegney (FR); Jean-Luc Perrin, Girmont (FR); Chris Groves, Domevre sur Durbion (FR); Damien Marsal, Golbey (FR)

(73) Assignee: Garrett Transportation I Inc., Torrance, CA (US)

( * ) Notice: Subject to any disclaimer, the term of this patent is extended or adjusted under 35 U.S.C. 154(b) by 526 days.

(21) Appl. No.: 15/273,595

(22) Filed: Sep. 22, 2016

(65) Prior Publication Data

US 2018/0080370 A1    Mar. 22, 2018

(51) Int. Cl.
| | | |
|---|---|---|
| F02B 37/00 | (2006.01) | |
| F02B 37/18 | (2006.01) | |
| F02B 37/013 | (2006.01) | |

(52) U.S. Cl.
CPC .......... *F02B 37/186* (2013.01); *F02B 37/004* (2013.01); *F02B 37/013* (2013.01); *Y02T 10/144* (2013.01)

(58) Field of Classification Search
CPC ..... F02B 37/004; F02B 37/013; F02B 37/186
USPC ........................................................ 60/616
See application file for complete search history.

(56) References Cited

U.S. PATENT DOCUMENTS

| | | | | |
|---|---|---|---|---|
| 3,851,538 A | * | 12/1974 | Denkowski | ............... F16H 1/16 74/425 |
| 4,727,762 A | * | 3/1988 | Hayashi | ................ F16C 19/548 384/517 |
| 6,810,768 B2 | | 11/2004 | Comfort et al. | |
| 8,353,153 B2 | | 1/2013 | Kotrba et al. | |
| 2012/0304952 A1 | * | 12/2012 | Perrin | .................... F01D 17/141 123/188.2 |

FOREIGN PATENT DOCUMENTS

| | | |
|---|---|---|
| DE | 10 2010 020115 A1 | 11/2011 |
| EP | 2 530 275 A2 | 12/2012 |
| EP | 2 693 016 A2 | 2/2014 |

OTHER PUBLICATIONS

Machine Translation DE 10 2010 020115 Done Jun. 4, 2018.*
Lee Spring, Custom Belleville Washers, Specification Form, 2011 (2 pages).
European Patent Application No. EP17191498.9, Search and Examination Report, dated Dec. 22, 2017 (7 pages).

* cited by examiner

*Primary Examiner* — Mark A Laurenzi
*Assistant Examiner* — Dapinder Singh
(74) *Attorney, Agent, or Firm* — Brian J. Pangrle

(57) ABSTRACT

An assembly for an exhaust bypass valve of a two-stage turbocharger can include a first turbocharger stage; a second turbocharger stage; an exhaust bypass valve that includes an open state and a closed state; an actuator; and a linkage mechanism that links the exhaust bypass valve to the actuator where the linkage mechanism includes a spring-biased linkage with a preset load where, in the closed state of the exhaust bypass valve, an axial length of the spring-biased linkage increases responsive to application of a load by the actuator that exceeds the preset load.

20 Claims, 14 Drawing Sheets

LINKAGE FOR EXHAUST BYPASS VALVE OF MULTI-STAGE TURBOCHARGER

TECHNICAL FIELD

Subject matter disclosed herein relates generally to turbomachinery for internal combustion engines and, in particular, to mechanisms for exhaust bypass valves of multi-stage turbochargers.

BACKGROUND

An exhaust bypass valve is often used to control operation of serial turbocharger systems. Such a valve may be operated to physically divert exhaust or alter pressures in exhaust pathways, for example, to direct exhaust flow partially or fully to one of multiple turbines in a system. During operation, a typical exhaust bypass valve experiences high exhaust pressure on one side and lower pressure on the other side. To effectively seal the high pressure environment from the low pressure environment, considerable force is required to maintain contact between a valve and a valve seat. In a sealed state of a valve and valve seat, pressure differentials may challenge one or more inter-component seals and result in detrimental exhaust leakage.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where:

FIGS. 8C and 8D show cross-sectional views of the spring-biased linkage of FIGS. 8A and 8B in two example states;

DETAILED DESCRIPTION

Figure 1:
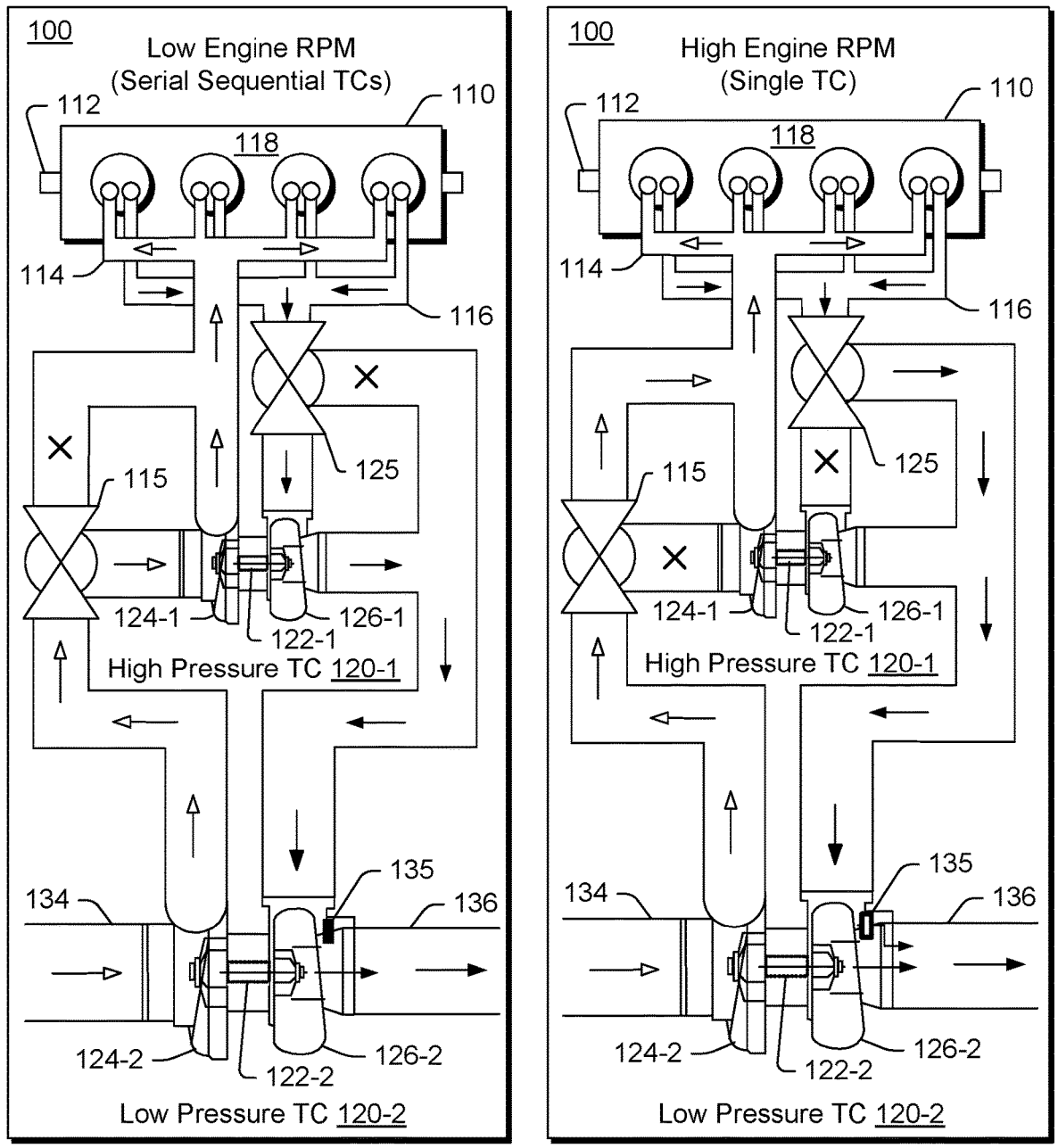
FIG. 1 is a diagram of an example of a system that includes turbochargers and an internal combustion engine along with a controller.

Turbochargers are frequently utilized to increase output of an internal combustion engine. FIG. 1 shows a system 100 in two operational configurations (low engine RPM and high engine RPM) where the system 100 includes an internal combustion engine 110 and turbochargers 120-1 and 120-2 in a serial sequential arrangement.

The internal combustion engine 110 includes an engine block 118 housing one or more combustion chambers that operatively drive a shaft 112 (e.g., via pistons) where rotation of the shaft 112 determines, for example, engine revolutions per minute (RPM). As shown in FIG. 1, an intake manifold 114 provides a flow path for air to the engine block 118 while an exhaust manifold 116 provides a flow path for exhaust from the engine block 118.

Each of the turbochargers 120-1 and 120-2 can act to extract energy from the exhaust and to provide energy to intake air, which may be combined with fuel to form combustion gas. As shown in FIG. 1, each of the turbochargers 120-1 and 120-2 includes a shaft 122-1 and 122-2, a compressor 124-1 and 124-2, and a turbine 126-1 and 126-2. Each of the turbochargers 120-1 and 120-2 may include a housing, which may be referred to as a center housing (e.g., disposed between a respective compressor and turbine). As an example, a turbocharger shaft may be a shaft assembly that includes a variety of components.

As to fluid flow to and from the serial sequential arrangement of turbochargers 120-1 and 120-2, an air intake 134 receives inlet air, which is directed to the compressor 124-2 and an exhaust outlet 136 receives exhaust from the turbine 126-2, which may include an exhaust wastegate valve 135. The wastegate valve 135 can be controlled to allow exhaust to bypass the turbine 126-2. As an example, the turbine 126-2 may optionally include one or more variable geometry mechanisms such as, for example, vanes that can be adjusted to alter shape and/or size of exhaust throats that direct exhaust from a volute to blades of a turbine wheel (e.g., consider a variable nozzle turbine (VNT) or a variable geometry turbine (VGT)).

In the low engine RPM operational state, the turbochargers 120-1 and 120-2 are operated in series, sequentially. Specifically, exhaust from the exhaust manifold 116 is directed first to the turbine 126-1, which causes rotation of the compressor 124-1, and then to the turbine 126-2, which causes rotation of the compressor 124-2. As the turbine 126-1 extracts energy from the exhaust, the exhaust pressure decreases while the compressor 124-1 increases boost pressure (e.g., pressure differential between its inlet and outlet). In the example system 100, based on compressor inlet pressure, the turbocharger 120-1 is referred to as a high pressure turbocharger while the turbocharger 120-2 is referred to as a low pressure turbocharger for the serial sequential operational state. As indicated in FIG. 1, compressed intake air from the compressor 124-2 (e.g., receiving air at atmospheric conditions) is compressed and directed to an inlet of the compressor 124-1 (e.g., receiving the compressed air, which is at a pressure greater than atmospheric). Such an arrangement may be referred to as dual-stage compression.

In the low engine RPM operational state, an air valve 115 may be configured in an orientation that directs compressed air from the compressor 124-2 to the inlet of the compressor 124-1 and an exhaust valve 125 may be configured in an orientation that directs exhaust from the manifold 116 to the turbine 126-1. During operation, either or both of the valves 115 and 125 may be regulated. For example, the valve 115 may be regulated such that at least some intake air bypasses the compressor 124-1 and the valve 125 may be regulated such that at least some exhaust bypasses the turbine 126-1. Such regulation may occur while the system 100 is maintained in a serial sequential operational state. In contrast, when the air valve 115 is configured in an orientation that causes full or substantial bypass of the compressor 124-1 and when the exhaust valve is configured in an orientation that causes full or substantial bypass of the turbine 126-1, the system 100 operates fully or essentially as a single turbocharger system. Such an operational state is typically selected for high engine RPM.

As the high engine RPM operational state relies on the turbocharger 120-2 and as high engine RPM logically follows low engine RPM, regulation of the exhaust valve 125 can act to pilot the low pressure turbocharger 120-2. For example, when a preset engine RPM or boost pressure is reached, a controller may actuate the exhaust valve 125 to increase flow of exhaust to the turbine 126-2 (e.g., via physical diversion or pressure differential). In such a scenario, the increased flow to the turbine 126-2 increases rotational speed of the shaft 122-2, which prepares the turbocharger 120-2 for a more rapid response and power output (e.g., with minimum turbo lag) upon configuration of the exhaust valve 125 in an orientation that causes full or significant bypass of the turbine 126-1.

The system 100 may also include other features, for example, a heat exchanger (e.g., or heat exchangers) may be positioned to cool compressed intake air prior to delivery of the compressed air to the combustion chambers of the engine 110. As an example, a heat exchanger may include a water-cooled compressor housing. As described herein, the system 100 may include one or more exhaust gas recirculation paths that can circulate exhaust to intake air; noting that exhaust valves and intake valves for combustion chambers of the engine 110 may be appropriately controlled to achieve some degree of exhaust "recirculation" (e.g., retention in a chamber).

In FIG. 1, an example of a controller 190 is shown as including one or more processors 192, memory 194 and one or more interfaces 196. Such a controller may include circuitry such as circuitry of an engine control unit. Such a controller may include circuitry that provides for reading, writing or reading and writing information (e.g., executable instructions, control instructions, data, etc.) to memory (e.g., a computer-readable storage medium). As described herein, various methods or techniques may optionally be implemented in conjunction with a controller, for example, through control logic. Control logic may depend on one or more engine operating conditions. For example, sensors may transmit information to the controller 190 via the one or more interfaces 196. Control logic may rely on such information and, in turn, the controller 190 may output control signals to control engine operation. The controller 190 may be configured to control an air valve (see, e.g., the air valve 115), an exhaust valve (see, e.g., the exhaust valve 125), a variable geometry assembly, a wastegate (see, e.g., the wastegate 135), an electric motor, or one or more other components associated with an engine, an exhaust turbine (or exhaust turbines), a turbocharger (or turbochargers), etc. With respect to valves, the controller 190 may be configured to act as an actuator or to transmit a signal to an actuator configured to actuate, for example, the air valve 115, the exhaust valve 125, the wastegate valve 135 (e.g., to close or open a wastegate), etc.

Figure 2:
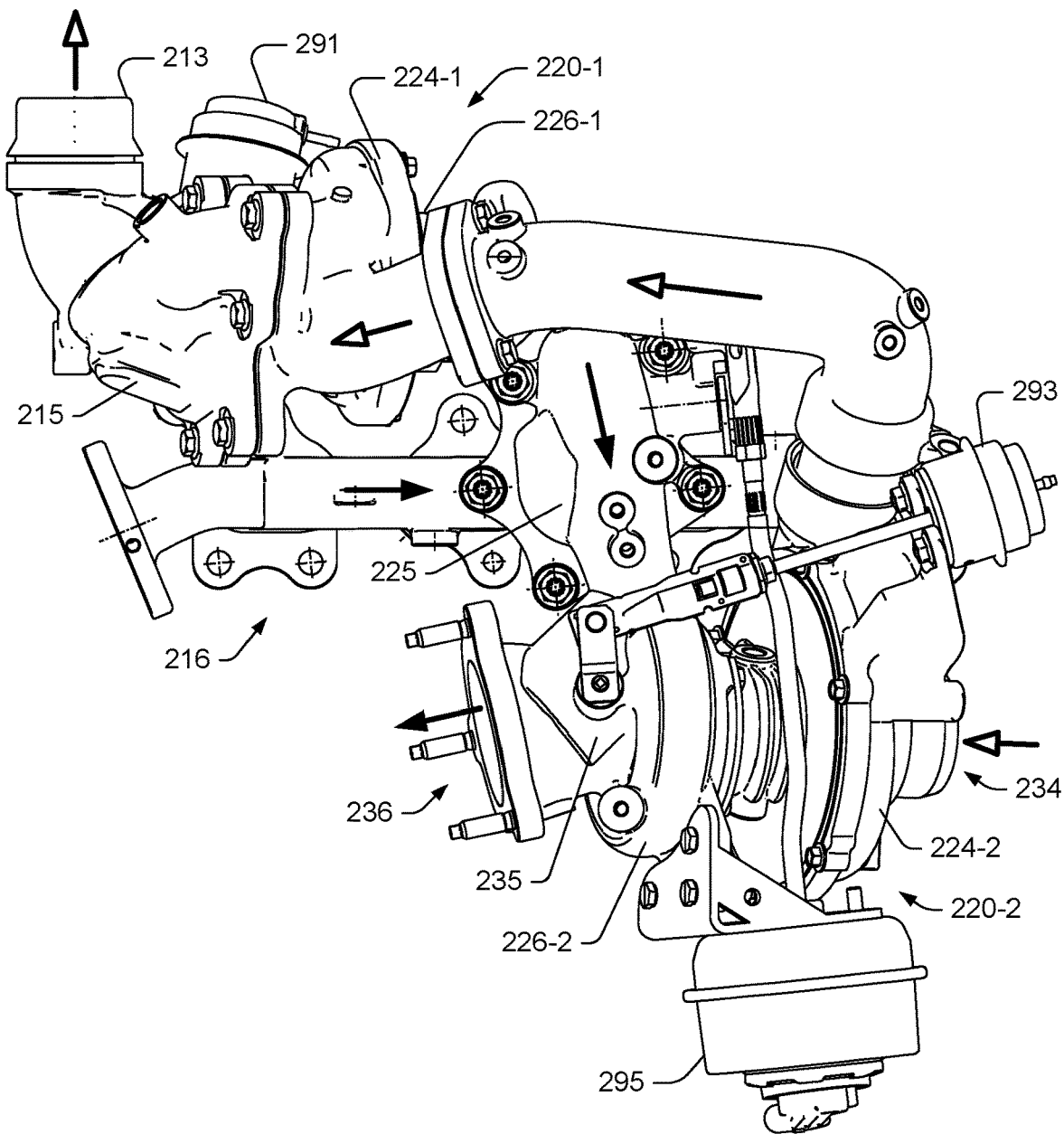
FIG. 2 is a perspective view of an example of a serial sequential turbocharger system.
Figure 3:
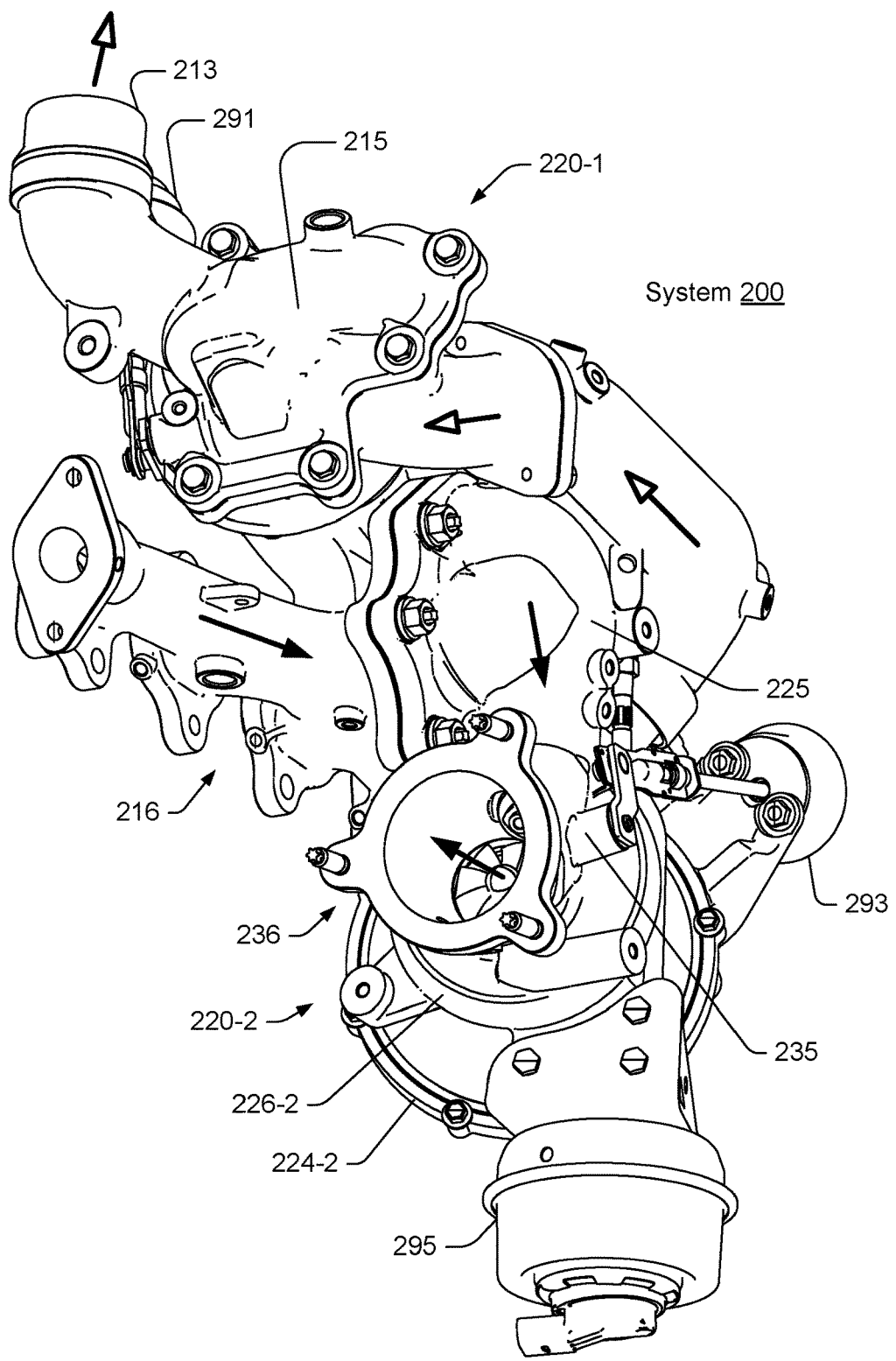
FIG. 3 is another perspective view of the serial sequential turbocharger system of FIG. 2.

FIGS. 2 and 3 show perspective views of a system 200 with two turbochargers 220-1 and 220-2 along with an air outlet 213, an air valve 215, an exhaust manifold 216, an exhaust valve 225, a wastegate 235, an air intake 234, an exhaust outlet 236, an air valve actuator 291, a wastegate actuator 293 and an exhaust valve actuator 295. Open headed arrows indicate intended air flow directions while solid headed arrows indicate intended exhaust flow directions. Each of the turbochargers 220-1 and 220-2 includes a compressor 224-1 and 224-2 and a turbine 226-1 and 226-2.

As described herein, a system capable of serial sequential turbocharger operation and single turbocharger operation may be arranged in any of a variety of manners. For example, an exhaust valve may be located in a variety of positions depending on number, shape and size of exhaust conduits. In general, an exhaust valve acts to cause flow of exhaust predominantly to a larger of the turbochargers, which is often referred to as a low pressure turbocharger in a serial sequential arrangement. As mentioned, an exhaust valve may act to physically bypass a smaller, high pressure turbocharger or it may act to alter pressure in pathways. As to the latter, with reference to the system 200, the exhaust valve 225 may be located adjacent the exhaust manifold 216 such that upon opening of the valve 225, exhaust flows along a lower pressure pathway to the larger turbine 226-2 of the low pressure turbocharger 220-2. In such an arrangement, the exhaust valve 225 can regulate exhaust flow form a high pressure source (e.g., manifold) to a lower pressure pathway.

As described herein, exhaust valve regulation may occur such that an exhaust valve is closed, open or in any intermediate state. In general, an exhaust valve opens in a direction facilitated by a pressure differential and closes in a direction opposed to the pressure differential. Such a valve arrangement provides for easier opening (e.g., less actuator force to open). An exhaust valve should be capable of effectively closing an exhaust opening (e.g., overcoming pressure differentials) such that, for low engine RPM, exhaust is directed to the smaller turbine.

Figure 4:
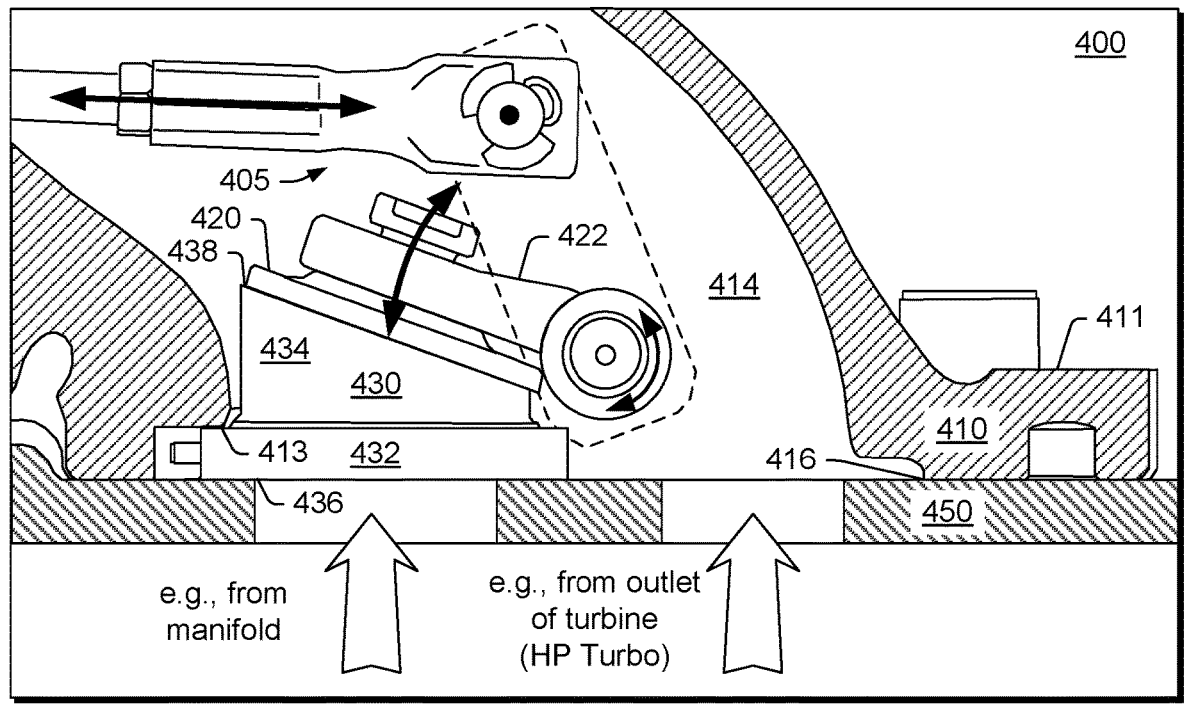
FIG. 4 is a cross-sectional view of an example of an exhaust bypass valve assembly.

FIG. 4 shows an example of an exhaust valve assembly 400 that may receive exhaust, for example, from a manifold and from an outlet of a turbine of a high pressure turbocharger (see, e.g., FIGS. 1, 2 and 3). For example, the assembly 400 includes a housing 410 with an exhaust inlet flange 411 configured to be operatively coupled to another component (e.g., or components) for receipt of exhaust. As shown in FIG. 4, the housing 410 defines a chamber 414 configured for receipt of exhaust, in part, responsive to position of a poppet 420 (e.g., a valve or valve plug), which is attached to and movable by an arm 422, where the arm 422 may be attached to or linked to an actuator (see, e.g., actuator assembly 405). As shown, a poppet can act as a plug, for example, to plug or seal an opening (e.g., to plug or seal an opening to an exhaust manifold coupled to an internal combustion engine).

In the example of FIG. 4, the assembly 400 includes a valve seat 430 disposed between the housing 410 and another component 450, which may be a part of a manifold, attached to a manifold, etc. As shown, the valve seat 430 includes a base portion 432 and a wall portion 434 that extends axially away from the base portion 432 (e.g., as a pipe, cylindrical wall, etc.). Where the base portion 432 and the wall portion 434 include substantially circular cross-sections, the base portion 432 can include an outer diameter that exceeds an outer diameter of the wall portion 434. An exhaust passage is defined by an inner surface of the valve seat 430, which may be a substantially cylindrical surface.

In the example assembly 400 of FIG. 4, the housing 410 includes a recess 413 that extends axially inwardly from a face 416 of the housing 410 (e.g., optionally including one or more shoulders, etc.) and that can receive the valve seat 430. In the example assembly 400 of FIG. 4, the valve seat 430 includes a surface 436 and a surface 438, which is disposed at an angle, for example, defined relative to the surface 436, a planar surface of the component 450, the face 416 of the housing 410, etc., upon which the poppet 420 may be seated when the poppet 420 is in a closed state. Such an angle (e.g., a swing angle) may reduce a rotational angle when moving the poppet 420 between an open state and a closed state. As an example, a valve seat may include a surface to seat a poppet where the surface is disposed in an assembly at an angle of about zero degrees. For example, consider the valve seat 430 as having the surface 438 being parallel to the surface 436, which may result in a greater travel distance (e.g., angle of rotation) for the arm 422 to seat the poppet 420 against the surface 438. In such an example, a lower surface of the poppet 420 may be about parallel to the interface between the housing 410 and the component 450 (e.g., and about parallel to a plane of a gasket or gaskets disposed between the housing 410 and the component 450). As an example, an angle may be considered in a force diagram, for example, to consider force applied to a valve seat by a poppet and balance of that force (e.g., as to one or more components that are in directly or indirectly in contact with the valve seat).

Figure 5:
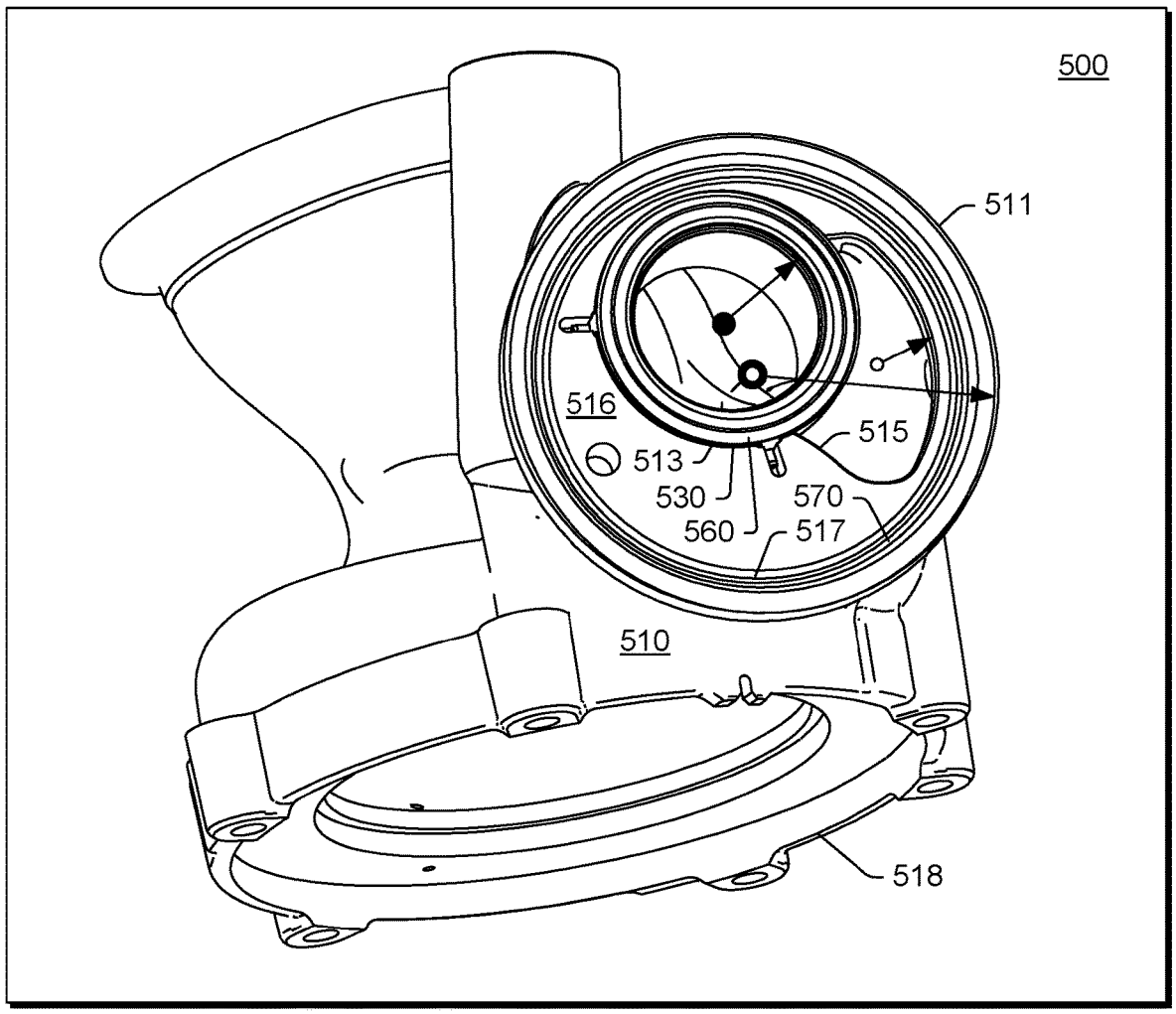
FIG. 5 is a perspective view of an example of an exhaust bypass valve assembly.

FIG. 5 shows a perspective view of an assembly 500 that includes a housing 510, a valve seat 530, a gasket 560 and a gasket 570. In the example of FIG. 5, the housing 510 includes an exhaust inlet flange 511 configured for connection to another component for receipt of exhaust and a housing flange 518 for operatively coupling the housing 510 to, for example, a center housing of a turbocharger. As shown in the example of FIG. 5, the housing flange 518 includes an opening for receipt of a turbine (e.g., a turbine wheel) where, for example, exhaust entering via the exhaust inlet flange 511 may flow to a volute defined by the housing 510 to be directed to the turbine (e.g., and then axially outwardly from the turbine to an exhaust outlet of the housing 510).

In the example of FIG. 5, the housing 510 includes a recess 513, a face 516 and a recess 517 as well as an edge 515 that defines an opening for flow of exhaust (e.g., from an outlet of a high pressure turbine). In the example assembly 500 of FIG. 5, the gasket 560 is seated on the valve seat 530, which is received by the recess 513 of the housing 510, and the gasket 570 is seated in the recess 517 of the housing 510. As an example, the gasket 560 may include a V-shaped cross-section formed by a single piece or multiple pieces where the V-shaped cross-section is open about an inner perimeter and closed about an outer perimeter. As an example, a closed side of a V-shaped cross-section of the gasket 560 may be formed by a joint between two pieces such as an upper piece and a lower piece. As an example, the joint may be formed upon application of clamping force (e.g., by joining two components with the two pieces of the gasket therebetween) or, for example, the joint may be formed by welding or other process to join two pieces (e.g., in a manner where a seal is formed therebetween).

As an example, a two-stage turbine bypass valve (TBV) can include a valve plug that, in a closed state, is to be held with force sufficient to overcome exhaust gas manifold pressure at low power/low engine rpm operating points. The relatively high pressure differential across the valve equates to a relatively large, continuous actuator force to be applied to via a TBV control mechanism (e.g., TBV control actuator).

As an example, an electric actuator can be utilized; however, an electrical actuator may be less desirable as to high, continuous load operating conditions due to the resistive heating of actuator motor coils, which can limit available peak, continuous force. As to relatively large vacuum pneumatic actuators, these require a vacuum source (e.g., engine mounted vacuum pump) and tend to be more suitable for on-off type operation rather than fine-control actuation, which can be desirable during the 2-stage system transition from a high pressure turbo to a low pressure turbo.

As an example, a rotary actuator can be utilized to transition a TBV plug between closed and open states using a four bar linkage where a rod assembly includes a spring feature, which may be integral and/or a spring assembly fit to a rod, rod ends, etc. As an example, once a valve plug is in a closed state against a valve seat, an actuator continues to rotate a shaft (e.g., a peg, pin, etc.), applying an increased sealing force to the valve plug and stretching the spring feature. In such an example, the actuator can rotate to a degree that is past a linkage dead-point until contact is made with an external hard-stop while the valve plug remains relatively stationary with respect to the valve seat. Such contact can correspond to a closed and locked state where, for example, the actuator does not require electrical power to maintain the valve plug in the closed and locked state. For example, in a closed and locked state, the valve plug can be held closed (forming a seal with respect to the valve seat) via a spring load.

As an example, a linkage assembly can include a compliant (e.g., spring-based) member that enables the linkage assembly to pass over a mechanism dead-point to a self-locking state (e.g., akin to a vice-grip wrench mechanism). In such an example, the mechanism may be held with the valve plug in a closed state without requiring an external actuator load. In such an example, an electric actuator may be utilized that, for example, includes a shaft that can be rotated and operatively coupled to the linkage assembly.

As an example, an electric actuator can be utilized as part of a kinematic mechanism with force multiplication near a dead-point where self-locking effects to reduce requirements as to a continuous actuator force.

As an example, a mechanism can include one or more rigid linkages, one or more pivots, and one or more spring elements. As an example, various tolerances may be specified, surface treatments applied, etc.

As an example, a linkage assembly can include one or more coil springs and/or one or more spring washers (e.g., Belleville washers, etc.).

Figure 6:
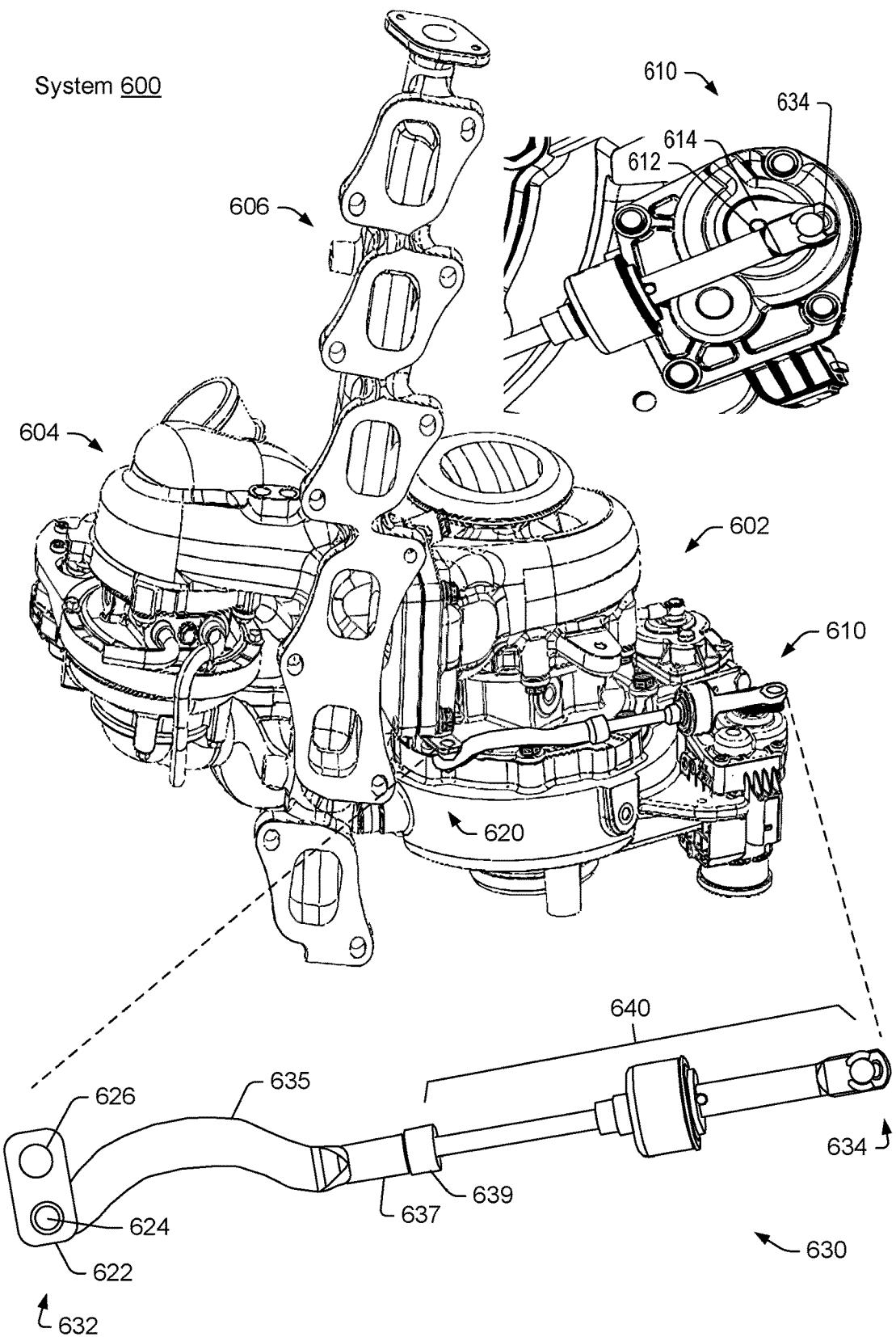
FIG. 6 is a perspective view of an example of a two stage turbocharger system that includes an example of an actuator and an example of a linkage assembly.

FIG. 6 shows an example of a two-stage turbocharger system 600 that includes turbochargers 602 and 604 that can receive exhaust via a manifold 606 where an actuator 610 can control a bypass valve 620 where a linkage assembly 630 is utilized as part of a control mechanism that connects the actuator 610 and the bypass valve 620.

As shown in the example of FIG. 6, the linkage assembly 630 includes a valve end 632 and an actuator end 634 where a linkage 622 includes a peg 624 operatively coupled to or part of the linkage assembly 630 and where the linkage 622 includes an opening or peg 626 operatively coupled to the bypass valve 620.

In the example of FIG. 6, the linkage assembly 630 includes an extension 635 with a relatively straight, axial portion 637 and a connector 639. As shown, the linkage assembly 630 includes a spring-biased linkage 640 that has an axial span from the connector 639 to the actuator end 634 of the linkage assembly 630.

FIG. 6 also shows the actuator 610 as including a rotatable shaft 612 operatively coupled to a linkage 614 that is operatively coupled to the actuator end 634 of the linkage assembly 630.

As mentioned, a four bar linkage approach can be utilized as part of a valve control mechanism. In such an example, a spring-biased linkage can be included such as, for example, the spring-biased linkage 640 of FIG. 6.

Figure 7:
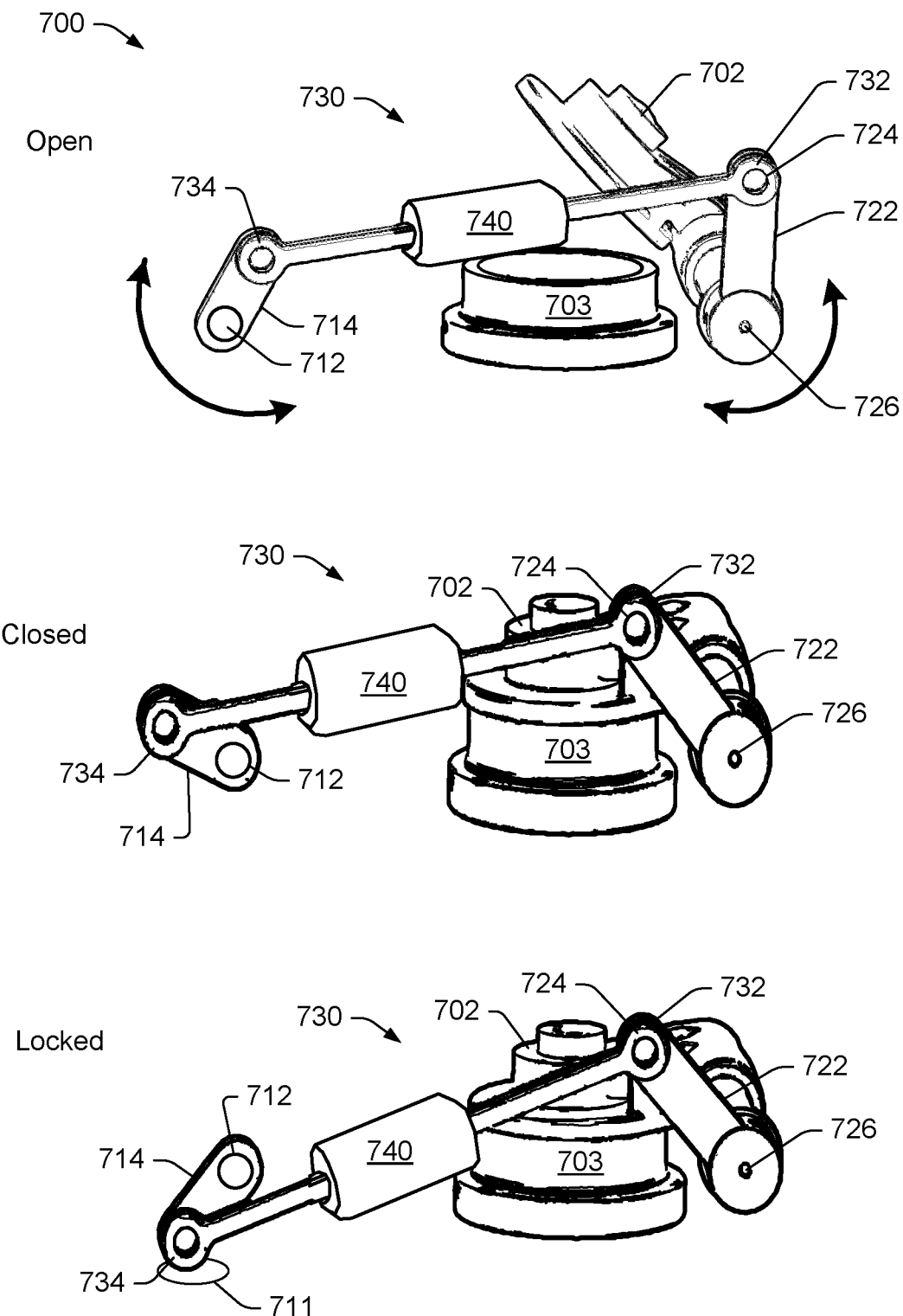
FIG. 7 shows a series of views of an example of a valve control mechanism.

FIG. 7 shows example states for an assembly that includes a valve plug 702, a valve seat 703, a rotatable shaft 712, a linkage 714, a linkage assembly 730 with an actuator end 734 and a valve end 734, a spring-biased linkage 740, and a linkage 722 that includes a linkage end 724 and a plug shaft end 726. As shown in FIG. 7, the example states include an open state, a closed state and a locked state, which is shown as a closed and locked state. In the closed and locked state, a hard-stop 711 is shown as a surface against which the linkage 714 may be biased against (e.g., a hard-stop surface). In the closed and locked state, an electric actuator may consume little energy (e.g., parasitic consumption or vampire consumption) as the assembly can be maintained in the closed and locked state via mechanics including spring-biasing.

As an example, a linkage assembly can include a spring-biased linkage where the linkage assembly includes a first link and a second link that are connected via the spring-biased linkage. For example, two rigid links (e.g., link assemblies) can be connected by a spring pack (e.g., or spring package). In such an example, a linkage assembly can include rigid links (e.g., link assemblies) where one or both of the rigid links can be a piston or pistons that can slide in a cylindrical housing (e.g., bore) where one or more spring elements bias the piston or pistons. In such an example, one of the rigid links can be fixed (e.g., to a spring pack housing or portion of a spring pack housing) and the other rigid link can be movable, such as being translatable along an axis of a linkage assembly, and spring-biased.

Figure 8A:
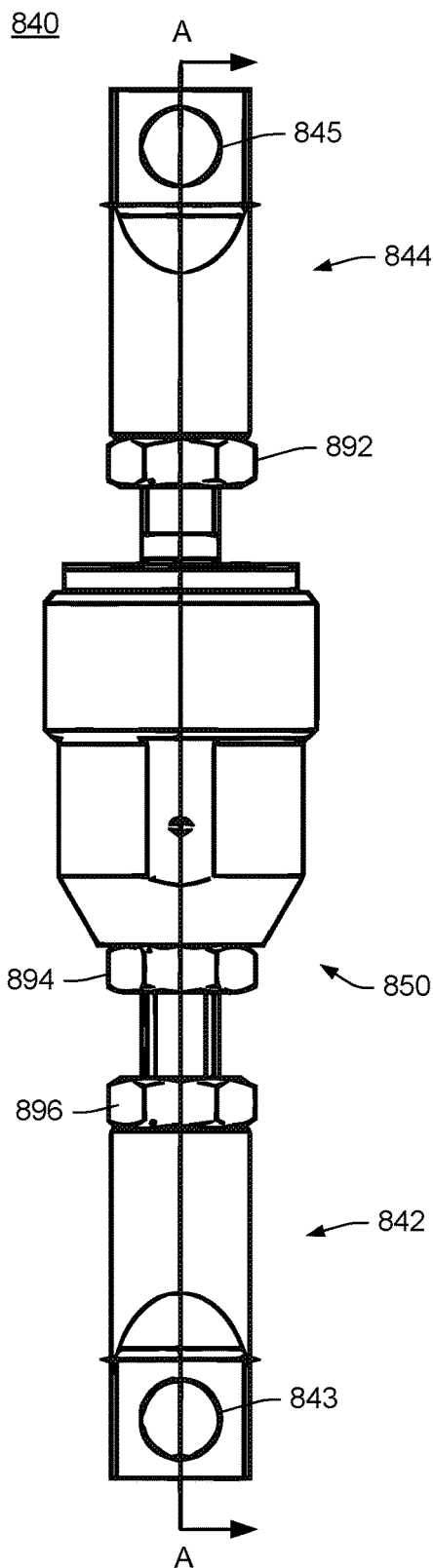
FIGS. 8A and 8B show a side view and a cutaway view of an example of a spring-biased linkage.
Figure 8B:
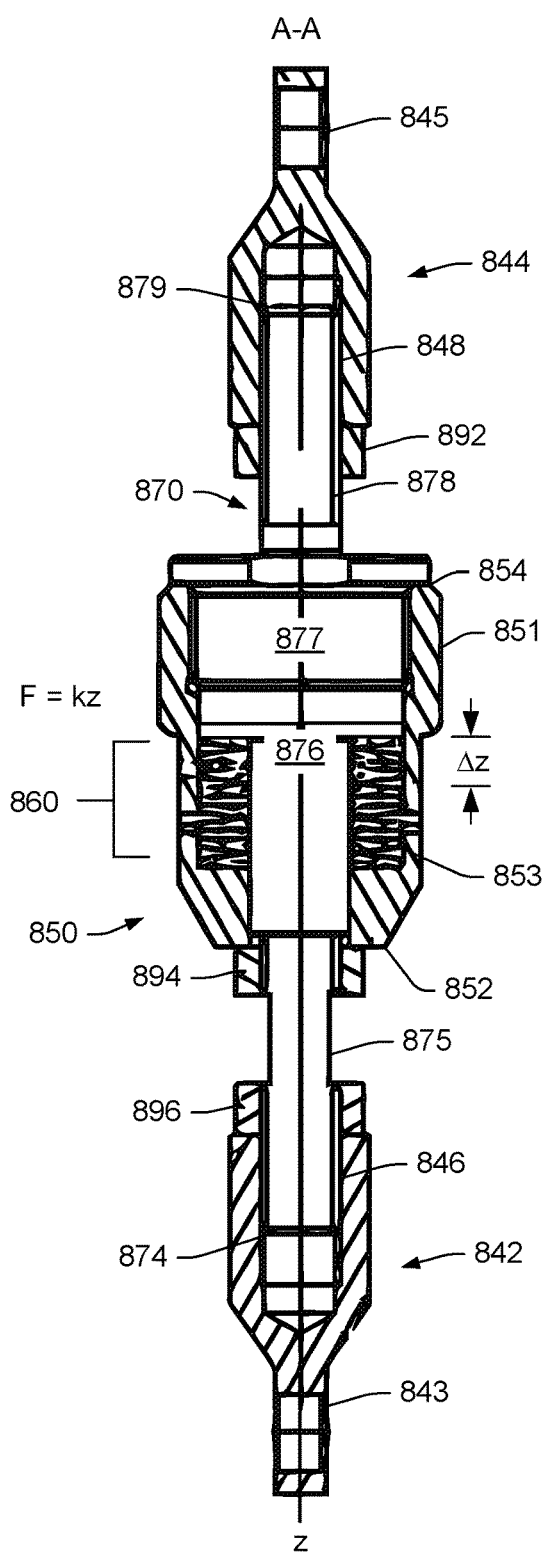

FIGS. 8A and 8B show an example of a spring-biased linkage 840 in a side view (FIG. 8A) and in a cross-sectional cutaway view along a line A-A (FIG. 8B). As shown, the spring-biased linkage 840 includes coupling 842 and 844 that are operatively coupled to a spring package 850 that includes one or more spring elements 860.

In FIG. 8B, an equation $F=kz$ is shown as being an approximate spring equation for the spring package 850 where the spring package 850 can provide for an amount of axial displacement $\Delta z$ along a z-axis. The axial displacement $\Delta z$ along the z-axis corresponds to an amount of displacement as to the coupling 842 with respect to the coupling 844. As shown, the coupling 844 is fixed to the spring package 850, as explained below, and the coupling 842 is axially translatable with respect to the spring package 850 and biased by the spring package 850 (e.g., one or more spring elements, etc. of the spring package 850).

As shown, the spring package 850 includes a housing 851 with opposing end 852 and 854 and a chamber 853 as defined at least in part via the housing 851. As an example, the chamber 853 can be substantially cylindrical in shape where the one or more spring elements 860 are substantially cylindrical in shape. As an example, the chamber 853 can be defined at least in part via a bore surface of the housing 851, which may be a cylindrical bore surface.

As shown in the example of FIGS. 8A and 8B, a rod assembly 870 includes, between opposing end 874 and 879, rod portions 875, 878 and 877 as well as piston portion 876 that moves with the rod portion 875 while the rod portions 877 and 878 are fixed to the housing 851 (e.g., immovably fixed to the housing 851).

As shown, the rod portion 877 is fixed to the housing 851 (e.g., via matching exterior threads of the rod portion 877 and interior threads of the housing 851 while the piston portion 876 can be in contact with the one or more spring elements 860 to apply force thereto or to receive force therefrom where the one or more spring elements 860 are set within the chamber 853 of the housing 851 and where the one or more spring elements 860 define an opening through which the piston portion 876 of the rod assembly 870 passes.

In the example of FIGS. 8A and 8B, the one or more spring elements 860 are substantially aligned as an axial stack that form opposing end surfaces and an opening or bore that extends between the opposing end surfaces where one of the end surfaces is supported by a wall of the housing 851 that defines in part the chamber 853 and where the other of the end surfaces can be in contact with (e.g., directly or indirectly) the piston portion 876 of the rod or rod assembly 870. For example, the piston portion 876 can include a cap portion (e.g., of a "T" shape) that may be a component that can be threaded into a threaded bore of the piston portion 876. In such an example, the cap portion can include an annular surface that can be of a diameter approximately the same as a diameter of an upper element of the one or more spring elements 860 (e.g., noting that flat washers may be included in a stack of one or more spring elements). The spring package 850 may operate as a spring-biased piston assembly where a portion of the rod assembly 870 acts as a piston that is biased by the one or more spring elements 860 as seated in the housing 851 of the spring package 850. In the example of FIGS. 8A and 8B, the spring-biased linkage 840 may act as the linkage 730, or a portion thereof, of the assembly 700 of FIG. 7. As an example, spring package 850 of FIGS. 8A and 8B may function as part of the spring-biased linkage 740 of the assembly 700 of FIG. 7.

In the example of FIGS. 8A and 8B, various adjustment features are shown, including adjustment nuts 892, 894 and 896. These nuts can include threads and may be utilized in combination with matching threads on one or more portions of the rod or rod assembly 870. As shown, the coupling 842 includes a bore 846 that receives the rod portion 875 where the nut 896 may be utilized to determine an appropriate length as to a coupling feature 843 (e.g., an opening, etc.) of the coupling 842. As shown, the coupling 844 includes a bore 848 that receives the rod portion 878 where the nut 892 may be utilized to determine an appropriate length as to a coupling feature 845 (e.g., an opening, etc.) of the coupling 844.

As an example, the nut 894 may be utilized as part of an adjustment mechanism to adjust a load applied by the one or more spring elements 860. For example, the nut 894 may adjust an axial limit as to the piston portion 876 of the rod assembly 870 with respect to the axial displacement $\Delta z$ (e.g., an axial throw limit, etc.). In such an example, the load can be a preload that is set such that a load greater than the preload will cause the one or more spring element 860 to compress and shorten in axial length while opposing couplings 842 and 844 move in opposite directions along the z-axis to length the distance between the coupling feature 843 and the coupling feature 845.

FIGS. 8C and 8D show the spring package 850 in two states where one state (right) is a compressed state compared to another state that is limited in axial position by the nut 894, which may be a loaded state. In the example of FIGS.

8C and 8D, the one or more spring elements 860 include a plurality of stacked spring washers (e.g., cone washers or coned washers). For example, about 1 to about 20 spring washers may be utilized, optionally with one or more flat washers. As an example, a number of spring washers and arrangement of spring washers may be utilized to achieve a desired load and/or spring constant.

Figure 8E:
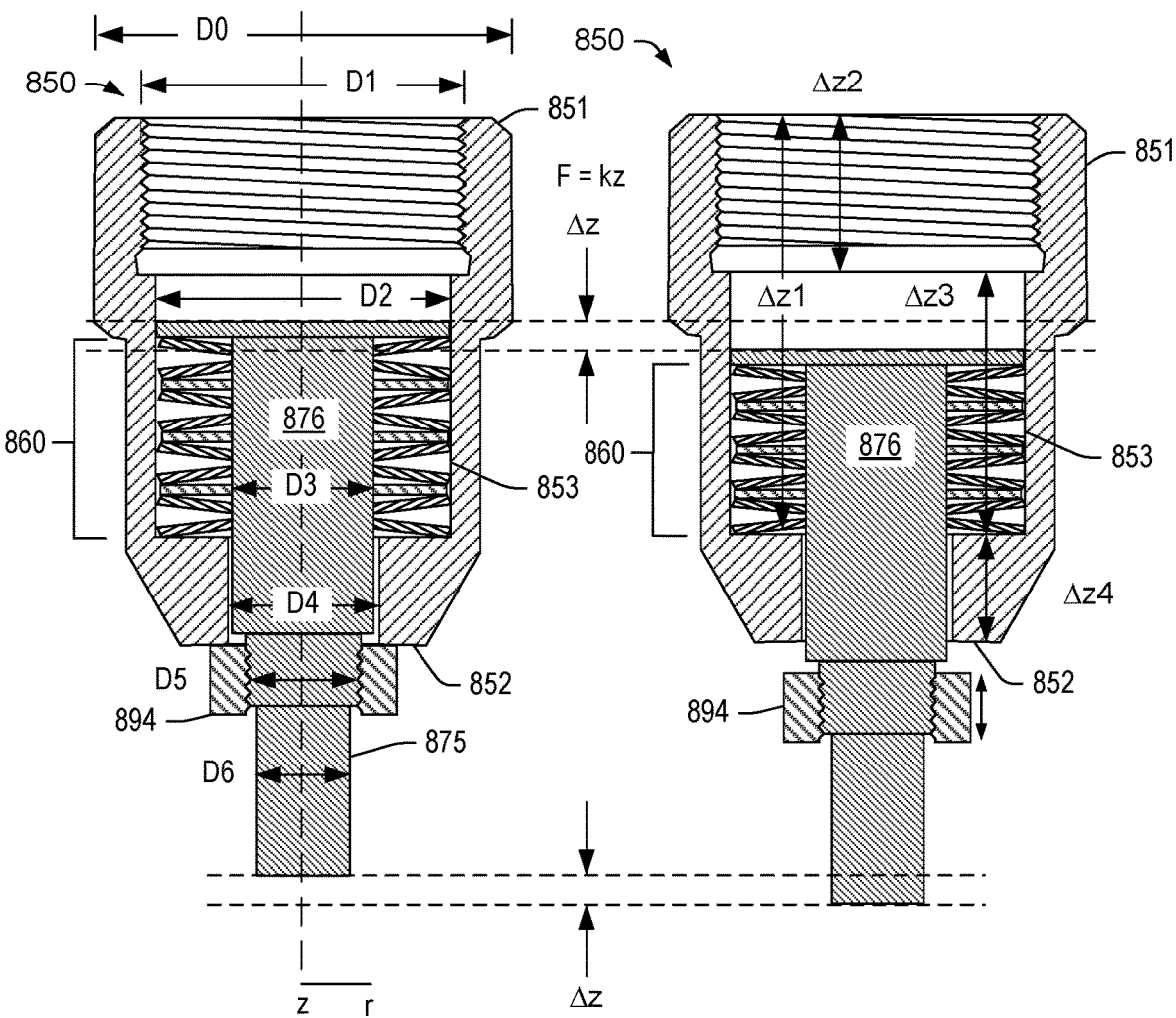
FIGS. 8E and 8F show a top view of the spring-biased linkage and a cross-sectional view of an example of a portion of a spring-biased linkage.
Figure 8E:
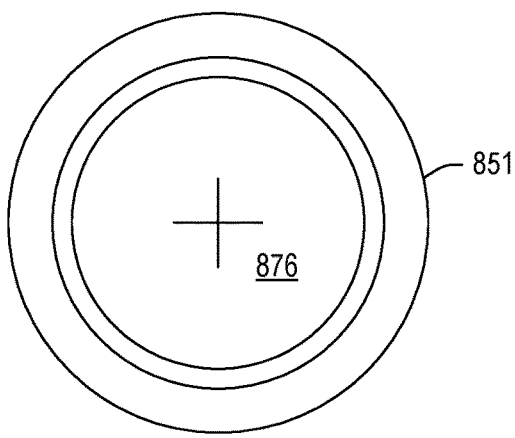
Figure 8F:
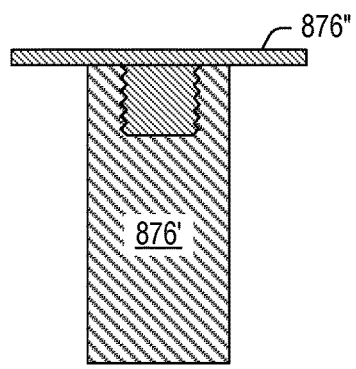

FIG. 8E shows a top view of the spring package 850 and FIG. 8F shows an example of the rod portion 876 that includes multiple pieces 876' and 876" that may be coupled together to form the rod portion 876. For example, the piece 876' can be a rod piece and the piece 876" can be a cap piece where the pieces 876' and 876" are connectable via threads, bayonet, or another type of attachment mechanism.

In FIG. 8C, various dimensions are shown such as an outer diameter (OD) D0 of the housing 851 and a threaded inner diameter (ID) D1 of the housing 851 (e.g., a threaded bore) for coupling of the rod portion 877 via matching threads on an outer diameter of the rod portion 877. As an example, the housing 851 may include threads at the outer diameter D0 where inner diameter threads of a coupling of a rod portion may be threaded thereto to connect a rod portion to the housing 851. As shown in FIG. 8B, the rod portion 877 may be attached such that a threaded portion threads into the housing 851 and a cap portion (e.g., of a "T" shape) contacts the end 854 of the housing 851. For example, the rod portion 877 can include an axial portion with a first diameter and an axial portion with a second larger diameter that can define a surface that can abut a surface of the housing 851 at the end 854. Where a housing includes OD threads, a coupling that includes ID threads may include a surface that can abut a surface of the housing. As an example, a washer (e.g., a locking washer) may be utilized to help assure that a threaded coupling mechanism remains immovable during operation.

In FIG. 8C, the dimensions illustrated also include an ID D2 of the housing 851, an OD D3 of the rod portion 876, an ID D4 of the housing 851, a threaded OD D5 of the rod portion 875 that mates with ID threads of the nut 894, and an OD D6 of the rod portion 875. As shown, the nut 894 can be adjusted with respect to the rod portion 875 to determine a load applied by the one or more spring elements 860 to the rod portion 876 (e.g., at its cap; see, e.g., top view of FIG. 8E and example of FIG. 8F). As shown in the compressed state (right), the nut 894 can translate axially away from the end 852 of the housing 851 during operation where an amount of force may be approximated by a spring equation such as F=kz (e.g., F=kΔz) where k is a spring parameter (e.g., a spring constant) of the one or more spring elements 860, which may be substantially linear for a relatively small range of axial translation during operation (e.g., less than about 10 mm).

As mentioned the loaded state (left) can have a load adjusted via the number and/or arrangement of spring elements 860 and the nut 894. In such an example, the load may be a base load where loading greater than the base load causes compression of the one or more spring elements 860.

As shown in FIG. 8C, the one or more spring elements 860 can include an opening or openings that allow the rod portion 876, at the OD D3, to pass therethrough and the housing 851 can include a bore portion, at the ID D4, that allows the rod portion 876, at the OD D3, to pass therethrough. As mentioned, a cap or cap portion of the rod portion 876 may optionally be an attachable portion, for example, as shown in FIG. 8F. In such an example, the cap or cap portion may be attached during assembly or, for example, prior to assembly of the rod portion 876 with respect to the housing 851.

Figure 9A:
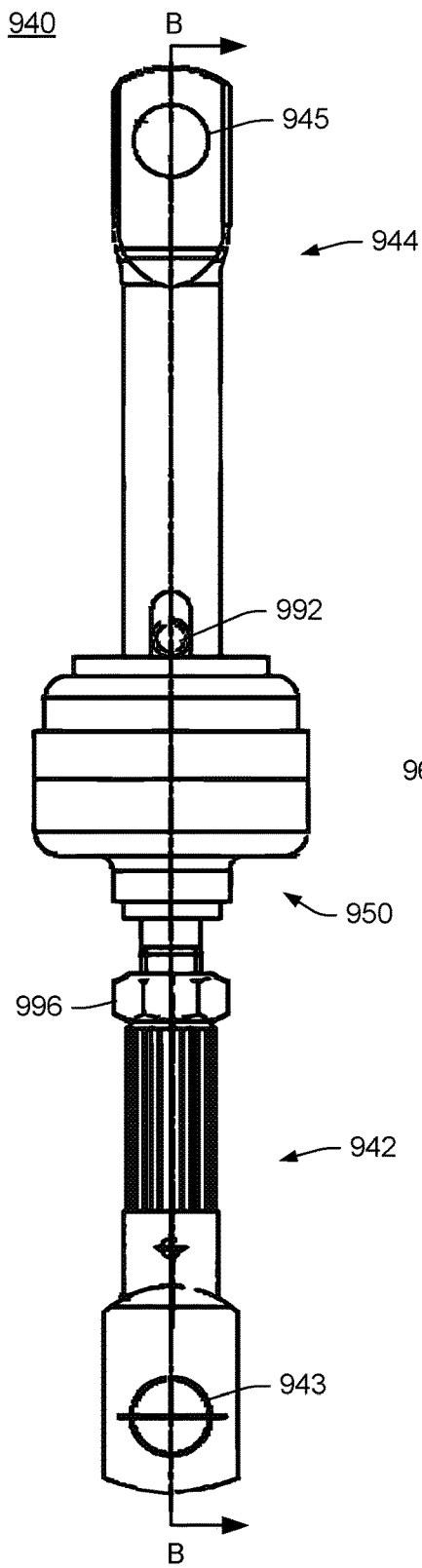
FIGS. 9A and 9B show a side view and a cutaway view of an example of a spring-biased linkage.
Figure 9B:
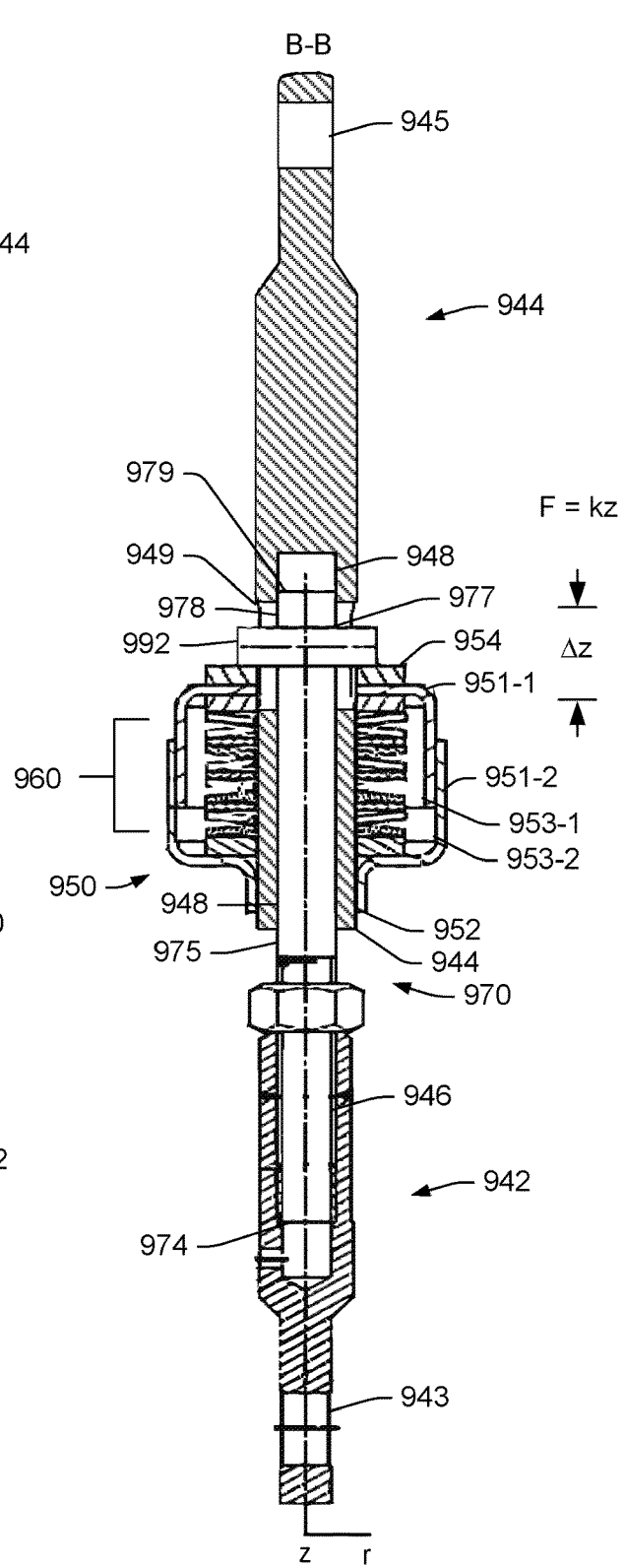

FIGS. 9A and 9B show an example of a spring-biased linkage 940 in a side view (FIG. 9A) and in a cross-sectional cutaway view along a line A-A (FIG. 9B). As shown, the spring-biased linkage 940 includes coupling 942 and 944 that are operatively coupled to a spring package 950 that includes one or more spring elements 960.

In FIG. 9B, an equation F=kz is shown as being an approximate spring equation for the spring package 950 where the spring package 950 can provide for a set amount of axial displacement Δz along a z-axis. The axial displacement Δz along the z-axis corresponds to an amount of displacement as to the coupling 942 with respect to the coupling 944. As shown, the coupling 944 is fixed to a portion of the spring package 950, as explained below, and the coupling 942 is axially translatable with respect to a portion of the spring package 950 and biased by the spring package 950.

As shown, the spring package 950 includes housings 951-1 and 951-2 with opposing end 952 and 954 and chambers 953-1 and 953-2 as defined at least in part via the housings 951-1 and 951-2. As shown, the housing 951-1 is nested with respect to the housing 951-2 such that a portion of the housing 951-1 can move into and out of the chamber 953-2 as defined by the housing 951-2. As an example, the chambers 953-1 and 953-2 can be substantially cylindrical in shape where the one or more spring elements 960 are substantially cylindrical in shape.

As shown in the example of FIGS. 9A and 9B, a rod assembly 970 includes opposing end 974 and 979 with rod portion 978 and piston portion 975. As shown, a pin 992 is received in a cross-bore 977 of the rod portion 978 of the rod assembly 970, which can provide for contact with the end 954 of the spring package 950 (e.g., for transfer of force to or from the housing 951-1 as biased by the one or more spring elements 960.

As shown, the coupling 944 extends into the housing 951-1 and 951-2 where an interference fit (e.g., a press-fit, etc.) may be made with respect to the housing 951-2 such that the coupling 944 is axially fixed (e.g., immovably) with respect to the housing 951-2. The piston portion 975 passes through a bore 948 of the coupling 944 and the coupling 944 includes axially elongated openings 949 through which the pin 992 extends. In such an example, the rod assembly 970 can axially translate with the pin 992 to compress the one or more spring elements 960 or to receive a biasing force from the one or more spring elements 960. As an example, the aforementioned axial displacement Δz may be determined, for example, by an axial length of the elongated openings 949.

As shown, the piston portion 975 can be operatively coupled to the housing 951-1 (e.g., a first housing) via the pin 992 in the cross-bore 977 and the one or more spring elements 960 can be supported by the housing 951-2 (e.g., a second housing) such that force can be transmitted from the piston portion 975 to the one or more spring elements 960 and such that force can be transmitted from the one or more spring elements 960 to the piston portion 975. In such an example, the housing 951-1 can move with respect to the housing 951-2 where spacing (e.g., clearance) between the housings 951-1 and 951-2 about the outer surface of the housing 951-1 and the inner surface of the housing 951-2 can be dimensioned to help to prevent debris from entering the spring package 950.

As shown in FIGS. 9A and 9B, the one or more spring elements 960 can apply force to or receive force from the rod or rod assembly 970 via the piston portion 975 where the one or more spring elements 960 are set within the chambers 953-1 and 953-2 of the housings 951-1 and 951-2 and where the one or more spring elements 960 define an opening through which the piston portion 975 of the rod assembly 970 passes (e.g., within the bore 948 of the coupling 944).

In the example of FIGS. 9A and 9B, the one or more spring elements 960 are substantially aligned as an axial stack that form opposing end surfaces and an opening or bore that extends between the opposing end surfaces where one of the end surfaces is supported by a wall of the housing 951-2 that defines in part the chamber 953-2 and where the other of the end surfaces can be in contact with (e.g., indirectly via a portion of the housing 951-1) the piston portion 975 of the rod assembly 970 via the pin 992 being received in the cross-bore 977 (e.g., which may define the portion 978 from the portion 975). The spring package 950 may operate as a spring-biased piston assembly where the rod assembly 970 acts as a piston that is biased by the one or more spring elements 960 as seated in the housings 951-1 and 951-2 (e.g., housing caps, etc.) of the spring package 950. In the example of FIGS. 9A and 9B, the spring-biased linkage 940 may act as the linkage 730, or a portion thereof, of the assembly 700 of FIG. 7.

In the example of FIGS. 9A and 9B, various adjustment features are shown, including an adjustment nut 996. The adjustment nut 996 can include threads and may be utilized in combination with matching threads on one or more portions of the rod assembly 970. As shown, the coupling 942 includes a bore 946 that receives the piston portion 975 where the nut 996 may be utilized to determine an appropriate length as to a coupling feature 943 (e.g., an opening, etc.) of the coupling 942. As shown, the coupling 944 includes the bore 948 that receives the rod portion 978 where the coupling 944 is set at an appropriate length as to the housing 953-2 (e.g., via interference fit, welding, threads, crimping, a locking pin, a locking washer, etc.).

Figures 9C, 9D:
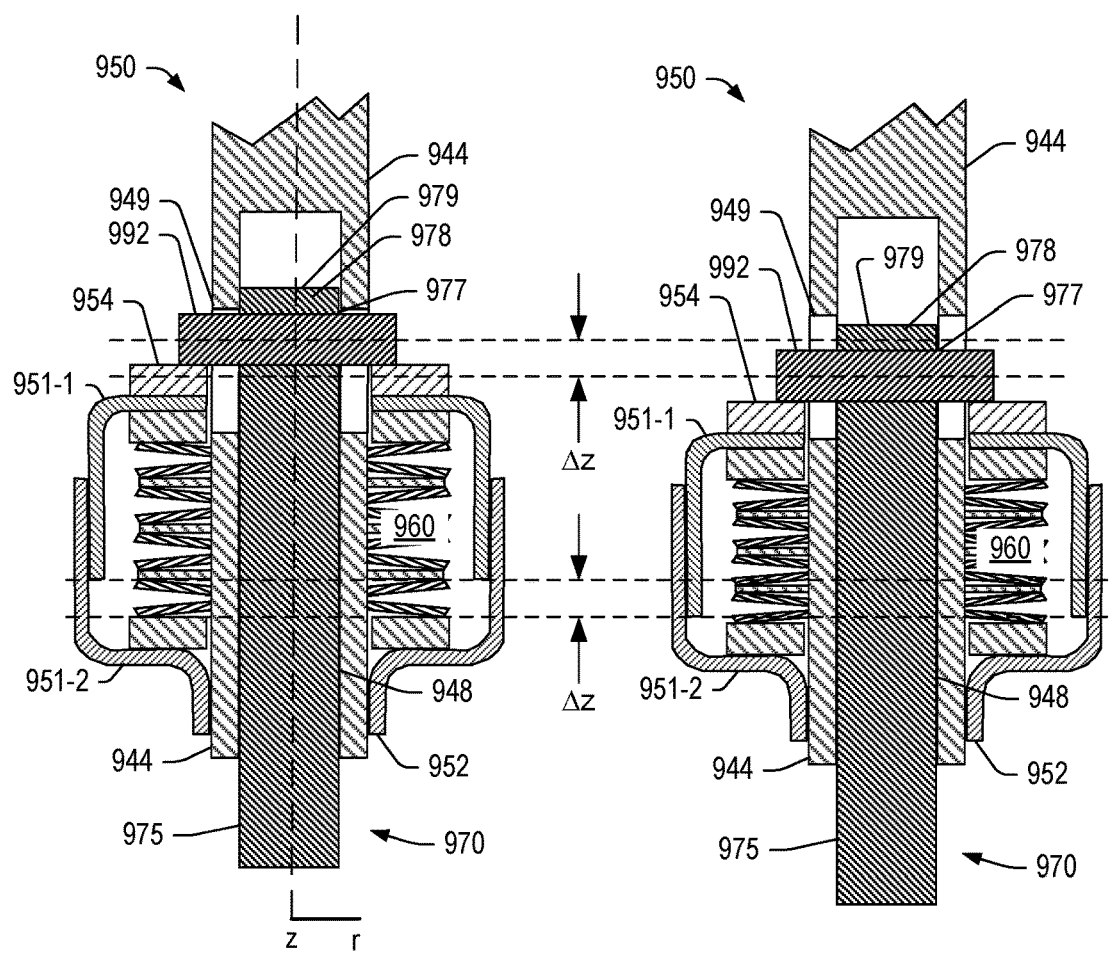
FIGS. 9C and 9D show cross-sectional views of the spring-biased linkage of FIGS. 9A and 9B in two example states.

FIGS. 9C and 9D show the spring package 950 in two states where one state (right) is a compressed state compared to another state that is limited in axial position by the opening 949 in the coupling 944, which may be a loaded state. In the example of FIGS. 9C and 9D, the one or more spring elements 960 include a plurality of stacked spring washers (e.g., cone washers or coned washers). For example, about 1 to about 20 spring washers may be utilized, optionally with one or more flat washers. As an example, a number of spring washers and arrangement of spring washers may be utilized to achieve a desired load and/or spring constant.

In the example states of FIGS. 9C and 9D, various dimensions may be described, for example, with respect to a cylindrical coordinate system r, Θ and z. For example, diameters and axial lengths may be defined for the various pieces as well as, for example, azimuthal positions such as the pin 992 being in the cross-bore 977 of the rod 970 where the coupling 944 includes the opening 949 as an elongated opening (e.g., oval, oblong, etc.) that can allow for positioning of the pin 992 as well as for determining an amount of load where a lower portion of the coupling 944 is coupled to the housing 951-2 in an axially immovable manner (e.g., interference fit, welding, threaded engagement, etc.). As an example, one or more features of the housing 951-2 and the coupling 944 can be one or more adjustment mechanism features that allow for adjustment of a preload (e.g., setting of a preload).

As shown in the example states of FIGS. 9C and 9D, the rod 970 and the pin 992 translate axially downwardly such that the housing 951-1 moves deeper into the housing 951-2 and such that the one or more spring elements 960 compress in a manner that may be described via a spring equation such as, for example, F=kz (e.g., or F=kΔz). As shown, the rod portion 975 translates in a bore 948 of the coupling 944 where the coupling 944 is fixed to the housing 951-2 and where the rod portion 975 is fixed via the pin 992 being received in the cross-bore 977 where the rod 970 includes the portion 978 axially above the pin 992 (e.g., the cross-bore 977) and the portion 975 below the pin 992 (e.g., the cross-bore 977).

Figure 9E:
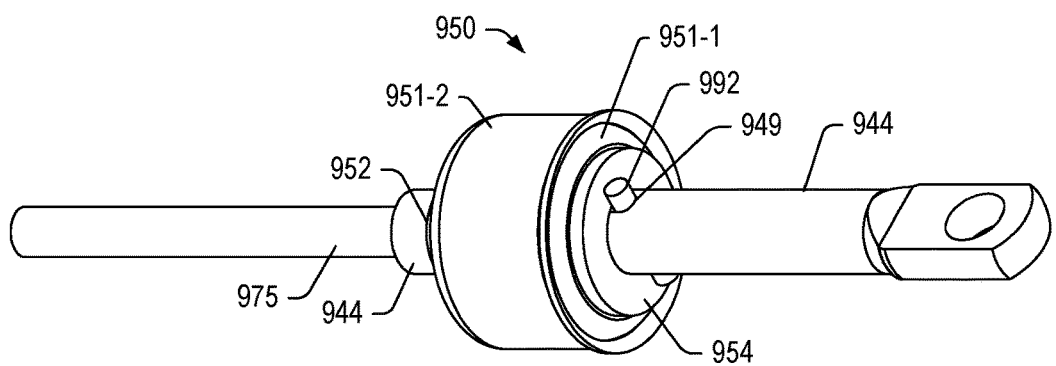
FIG. 9E shows a perspective view of the spring-biased linkage.

FIG. 9E shows a perspective view of the spring-biased linkage 940 including the spring package 950 where the pin 992 is received via the elongated openings 949 in the coupling 944 and received via the cross-bore 977 in the rod 970.

As shown in FIGS. 9A, 9B, 9C, 9D and 9E, the spring-biased linkage 940 can be loaded, for example, with a preload. Such a preload may be set via a positional relationship between the coupling 944 and the rod 970. For example, the housing 951-2 can be fixed to the coupling 944 in a manner that positions the pin 992 with respect to respective top portions of the two elongated openings 949 (e.g., parallel to each other and axially extensive) where the one or more spring elements 960 can be in a compressed state.

In FIG. 9E, the portion of the spring-biased linkage 940 is shown where the pin 992 is in contact with top portions of the elongated openings 949 as well as in contact with the end 954 of the spring package 950. As shown in the compressed state of FIG. 9D, the pin 992 is moved downwardly away from the top portions of the elongated openings 949. Where a preload is set, a force greater than the preload may further compress the one or more spring elements 960. For example, where a preload pushes the pin upward in FIG. 9C, a downward force that overcomes that preload can further compress the one or more spring elements 960 and move the pin 992 downward, which can lengthen the spring-biased linkage 940.

Figure 10:
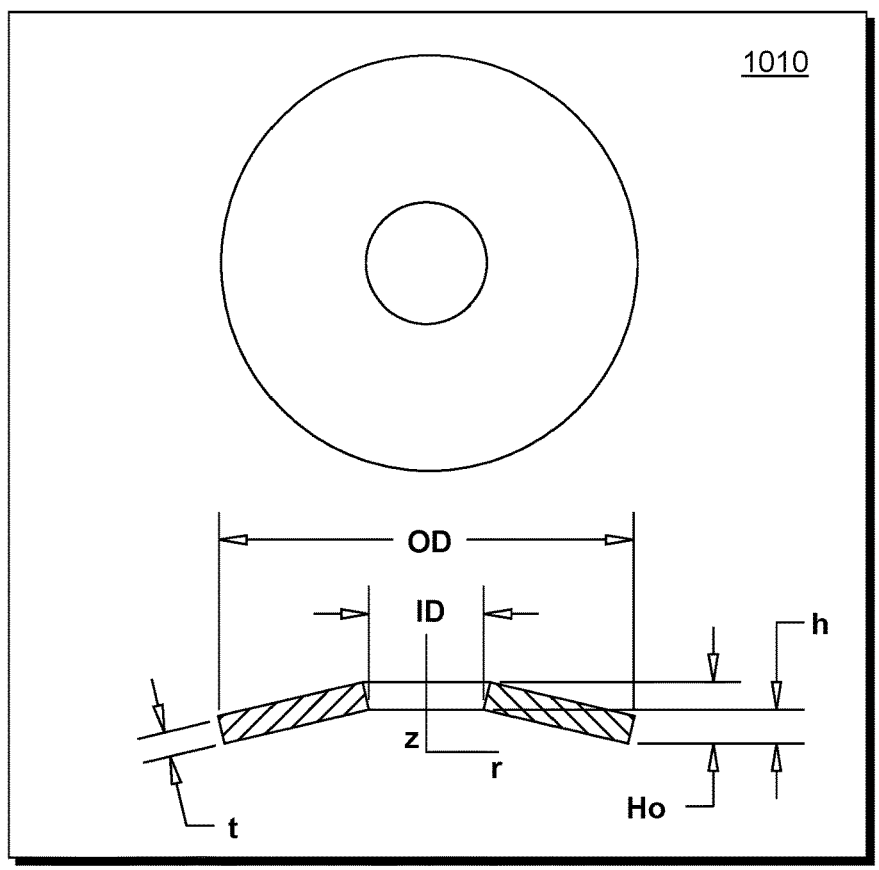
FIG. 10 shows examples of spring washers.
Figure 10:
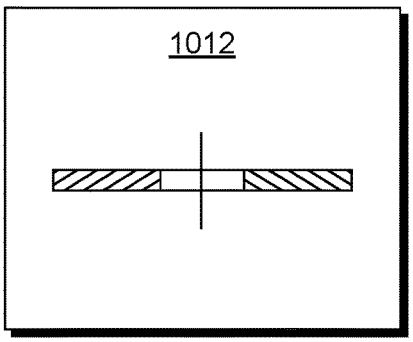
Figure 10:
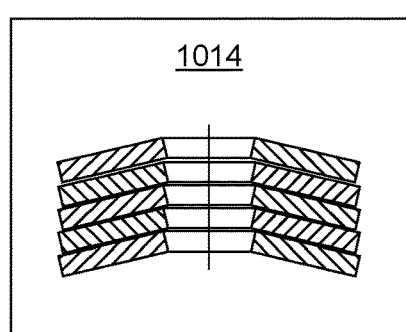
Figure 10:
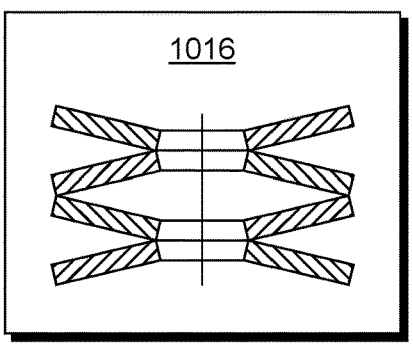
Figure 10:
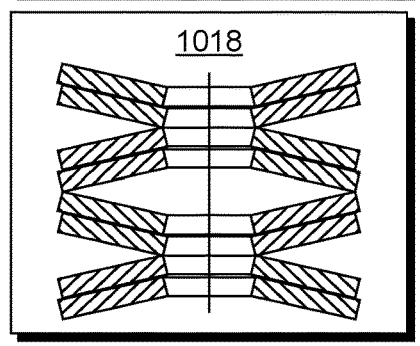

FIG. 10 shows an example of a spring washer 1010 (e.g., a cone washer or a coned washer or a spring element), an example of a flat washer 1012 and examples of spring washer stacks 1014, 1016 and 1018 (e.g., spring element stacks). As an example, the spring washer 1010 may be made of metal or an alloy (e.g., a metallic material). As an example, consider a carbon steel, a stainless steel or another type of material that can withstand operational temperatures and that can provide suitable material properties. As an example, the spring washer 1010 can be a Belleville washer (e.g., a Belleville spring).

As shown, the spring washer 1010 can be defined by an outer diameter (OD) and an inner diameter (ID) as well as by a thickness (t), a height (h) along an axis z (e.g., a central cone axis), which may be measured from a bottom surface to a bottom edge of the inner diameter (e.g., opening), and an overall height (Ho), as measured from a bottom to a top. As shown, the overall height (Ho) can be an uncompressed height where, upon loading, the height of the spring washer 1010 can decrease to a height less than the overall height (Ho). As shown, a plurality of the spring washers 1010 may be stacked to form one or more types of stacks, optionally including one or more flat washers such as the flat washer 1012. In such examples, a stack height, a throw (e.g., Δz), and a spring parameter for the throw may be determined. For example, a throw may be an axial dimension less than about 10 mm where the spring parameter may be substantially constant over the throw (e.g., F=kΔz).

As an example, a throw may be a maximum expected throw that can allow for transitioning from one state to another state. For example, FIG. 7 shows the open state, the closed state and the closed and locked state for an assembly. As an example, consider transitioning from the closed state to the closed and locked state where the spring-biased linkage 740 can allow the linkage assembly 730 to increase in its axial length between ends 732 and 734 (e.g., stretch) such that a maximum axial length is achieved during the transition from the closed state to the closed and locked state. In such an example, in the closed and locked state, the spring-biased linkage 740 can decrease in its axial length between ends 732 and 734 (e.g., contract) and apply a load that may help to maintain the linkage assembly 730 in the closed and locked state.

In the closed and locked state, the load applied by the spring-biased linkage 740 may be sufficient to allow for an actuator to be in a low power state (e.g., vampire power state) or, for example, an off power state. For example, the spring-biased linkage 740 can pull the end 734 against the surface 711 to maintain the valve plug 702 in a closed and locked state with respect to the valve seat 703.

To transition from the closed and locked state to the closed state and, for example, to the open state, an actuator may apply an actuation force that causes the linkage assembly 730 to lengthen axially via the spring-biased linkage 740. As an example, during transitions from the closed state to one or more open states, the spring-biased linkage 740 may be at a substantially fixed axial length. For example, axial length changes can be for transitions into and out of the closed and locked state (e.g., with respect to the closed state).

As an example, a spring-biased linkage may be referred to as a spring-biased locking linkage that allow an assembly to be placed into a locked state. As an example, the spring-biased linkage 740, the spring-biased linkage 840 and/or the spring-biased linkage 940 may be spring-biased locking linkages.

As an example, where a change in demand occurs, an actuator may be actuated (e.g., via electrical power) to transition from a closed and locked state to another state, which may be, for example, a closed and unlocked state or an open state. For example, one or more types of changes in demand may be associated with driving conditions, traffic signals, grade, etc. As an example, an actuator may optionally open a valve according to a control scheme that may be based on one or more factors (e.g., demand, pressure, etc.).

As mentioned with respect to FIG. 1, regulation of the exhaust valve 125 can act to pilot the low pressure turbocharger 120-2. For example, when a preset engine RPM or boost pressure is reached, a controller may actuate the exhaust valve 125 (e.g., transition to an open state or more open state) to increase flow of exhaust to the turbine 126-2 (e.g., via physical diversion or pressure differential). In such a scenario, the increased flow to the turbine 126-2 increases rotational speed of the shaft 122-2, which prepares the turbocharger 120-2 for a more rapid response and power output (e.g., with minimum turbo lag) upon configuration of the exhaust valve 125 in an orientation that causes full or significant bypass of the turbine 126-1.

As an example, a biasing mechanism can include a plurality of stacked coned washers that may be referred to as spring washers. For example, a biasing mechanism can include a plurality of Belleville washers, which can be coned washers (e.g., annular pieces of material that are angled as may be a portion of a cone). As an example, a coned washer can provide spring characteristics and may provide a relatively high fatigue life and a relatively high load capacity with a relatively small amount of deflection (e.g., of the order of millimeters, which may be less than about 10 mm or less than about 15 mm or less than about 25 mm).

As an example, coned washers may be stacked to modify an effective spring constant and/or an amount of deflection. As an example, stacking in the same conical direction can add to an effective spring constant in parallel, for example, to create a stiffer joint (e.g., with the same deflection); whereas, stacking in alternating conical directions can effectively be akin to adding springs in series, resulting in a lower spring constant and greater deflection. As an example, a biasing element can include stacking in one direction or stacking in two directions, for example, to tailor spring behavior and deflection.

As an example, where n washers are stacked in parallel (facing the same direction), the deflection is equal to that of one washer, while the load is n times that of one washer. On the other hand, if n washers are stacked in series (facing in alternating directions), the deflection is equal to n times that of one washer, while the load is equal to that of one washer. As an example, consider the following equation:

$$K = \frac{k}{\sum_{i=1}^{i=g} \frac{1}{n_i}}$$

where $n_i$ is the number of washers in the ith group, g is the number of groups and k is the spring constant of one washer and K is the total.

As an example, a 2-Stage TBV (Turbine Bypass Valve) mechanism can act to have a valve held closed against exhaust gas manifold pressure, for example, at low power/low engine RPM operating points. Relatively high pressure differentials across such a valve can require a relatively large, continuous actuator force to be applied to the mechanism. Various electric actuators may not necessarily be suited to high, continuous load operating conditions (e.g., due to the resistive heating of the actuator motor coils which can limit available peak, continuous force. Large vacuum pneumatic actuators may be used for these applications but they require a vacuum source (e.g., an engine mounted vacuum pump) and are more suited to on-off type operation rather than fine-control actuation which is desirable during the 2-stage system transition from the high pressure turbo to the low pressure turbo.

Figure 11:
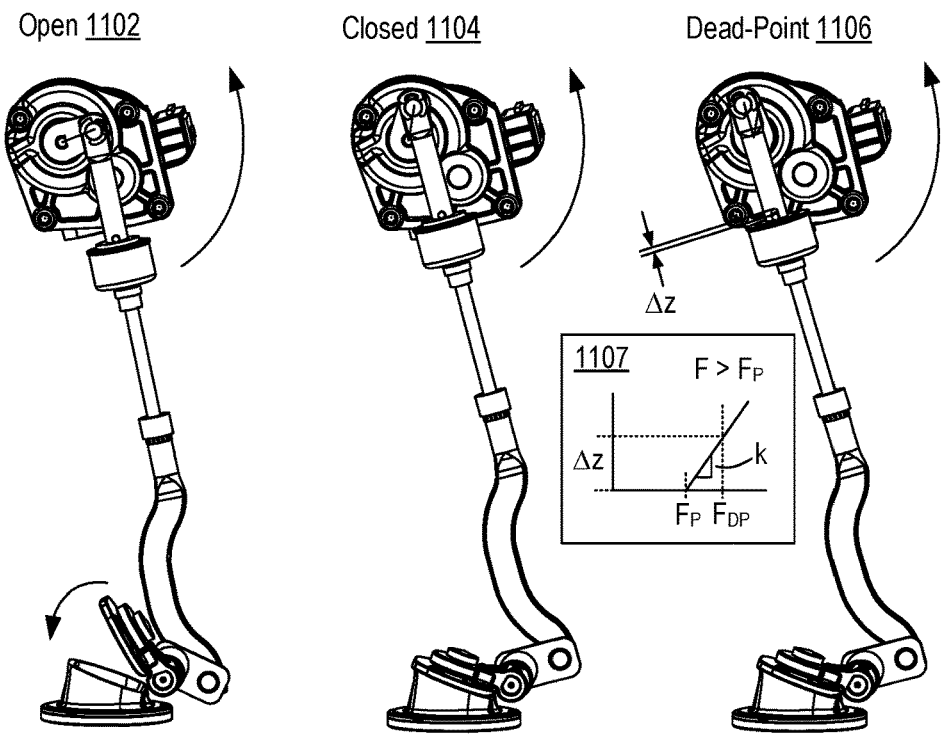
FIG. 11 shows examples of an assembly in different example states and example plots.
Figure 11:
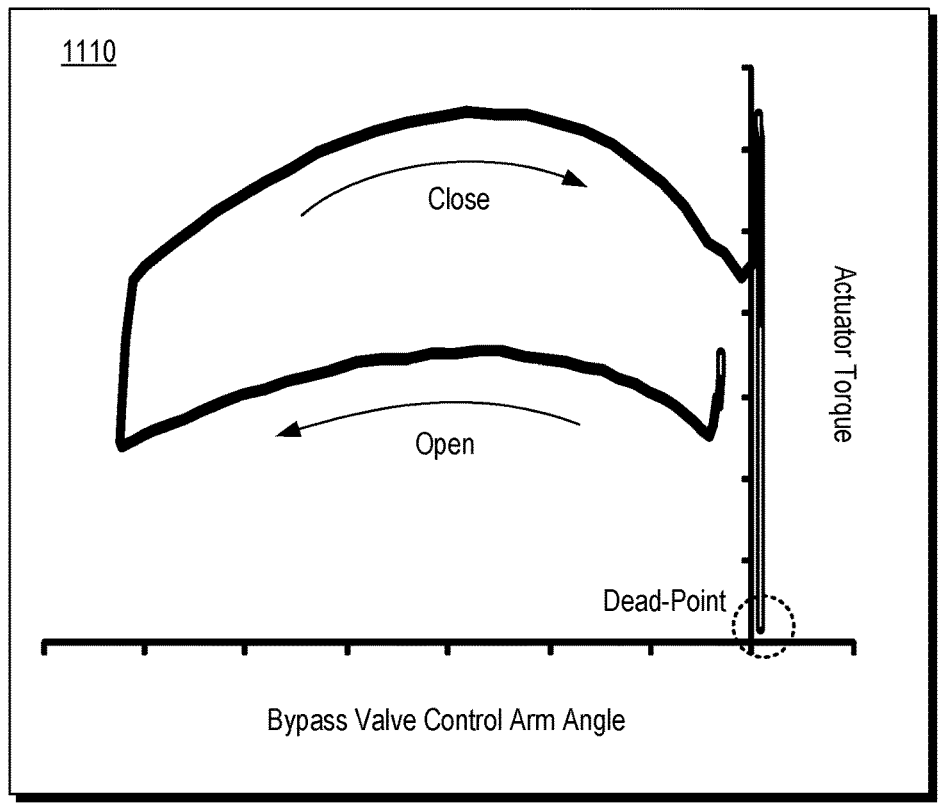

FIG. 11 shows example states that include an open state 1102, a closed state 1104 and a dead-point state 1106, an example plot 1107 as to behavior of a spring-biased linkage and also shows an example plot 1110 that includes operational paths (e.g., path segments) and states that are illustrated with respect to crank angle and actuator torque.

The example dead-point state 1106 is illustrated with a dimension Δz, which indicates an amount by which the linkage is extended in length compared to, for example, the example open state 1102 and the example closed state 1104; noting that an example hard-stop state can include a length that is less than for the example dead-point state 1106. As shown in FIG. 11, the axial length of the linkage can increase in the closed state 1104 where a valve plug is in contact with a valve seat of the exhaust bypass valve. In such a state, contact force between the valve plug and the valve seat can increase, which can increase sealing of the exhaust bypass valve, for example, with respect to an exhaust gas pressure differential where exhaust pressure is greater on a valve seat side than a valve plug side of the exhaust bypass valve.

As shown in the plot 1107, a spring-biased linkage can include a preload of value $F_P$ where application of force (e.g., load) F in excess of the preload value $F_P$ causes the spring-biased linkage to increase in its axial length. A particular length of the spring-biased linkage can be for a dead-point force (e.g., dead-point load), indicated by $F_{DP}$, which is shown to correspond to an axial increase in length of $\Delta z$, which, in the example of FIG. 11, occurs after the closed state 1104. As an example, a relationship such as F=kz may be utilized to determine one or more parameters that can be associated with control of an exhaust bypass valve. As an example, a spring parameter, which may be substantially constant over a relatively small displacement, may be determined via an arrangement of one or more cone washers in a spring-biased linkage. As an example, a method can include sizing a spring-biased linkage with respect to an exhaust bypass valve and an actuator, which may be an electric actuator. In such an example, these components can be operatively coupled such that a dead-point exists for a closed state of the exhaust bypass valve with respect to a valve seat such that power consumption of the electric actuator can be reduced (e.g., optionally to zero) while the closed state is maintained via force applied, at least in part, by the spring-biased linkage.

As an example, a method can include setting a preload value for a spring-biased linkage. For example, consider setting the value $F_P$ as shown in the plot 1107 by adjusting one or more components of a spring-biased linkage such as the nut 894 as shown in FIGS. 8A-8D or, for example, setting an axial relationship between the housing 951-2 and the coupling 944 as shown in FIGS. 9A-9D. Or, for example, sizing a pin such as the pin 992 (e.g., and its associated opening 977) as shown in FIGS. 9A-9D. As an example, a spring-biased linkage can be adjustable to set a preload value where lengthening of the spring-biased linkage occurs for load values greater than that preload value.

As shown in the plot 1110, the actuator torque increases to a peak at the dead-point that corresponds to the example dead-point state 1106 and can then decrease to approximately zero (e.g., or zero) at a hard-stop that corresponds to hard-stop state. In the example of FIG. 11, the difference in opening and closing paths can be due at least in part to, for example, exhaust pressure as exhaust pressure may facilitate opening a bypass valve.

As shown in the plot 1110, once the bypass valve is closed against a valve seat, the actuator can continue to rotate its shaft (e.g., or peg) to apply an increased sealing force to the bypass valve where the force stretches the spring-biased linkage (see, e.g., $\Delta z$ in the dead-point state 1106). As the actuator shaft rotates to a degree sufficient to move past the dead-point state of the linkage, the linkage may transition to a hard-stop state. In the hard-stop state, the actuator may be powered down (e.g., placed in a reduced power state), which may be a no power state. In the hard-stop state, the bypass valve can be held closed and sealed by the load provided by the spring-biased linkage.

As shown in the example of FIG. 11, as a shaft or peg of the actuator rotates counter-clockwise, the bypass valve transitions from the open state 1102 to the closed state 1104 where the bypass valve is in contact with the valve seat; thus, further movement does not occur for the bypass valve with respect to the valve seat. However, when the shaft or peg of the actuator rotates further counter-clockwise, the force exerted by the actuator causes the spring-biased linkage to lengthen by compression of one or more spring elements. As an example, a dead-point can be a center point. As an example, a dead-point can be reached via a rotational mechanism such as rotation of a shaft of an electric actuator where a linkage is attached to the shaft, which may rotate in a clockwise and may rotate in a counter-clockwise direction.

As an example, a shaft of an electric actuator can rotate while a valve plug remains substantially stationary and in contact with a valve seat (i.e., a closed state). In such an example, while the valve plug is in the closed state with respect to the valve seat, a spring-biased linkage operatively coupled to the electric actuator and operatively coupled to the valve plug can increase in its axial length as force is applied by the electric actuator through rotation of its shaft where the applied force exceeds a preload of the spring-biased linkage.

While various examples refer to an electric actuator that can include a rotary shaft (e.g., rotary drive), as an example, an electric actuator can provide for linear actuation movement where the electric actuator is operatively coupled to a linkage mechanism that includes an arrangement of components with some amount of rotary movement and where the linkage mechanism includes a dead-point associated with a closed state of a valve plug with respect to a valve seat and where, at the dead-point, power may be reduced to the linear electric actuator.

Figure 12:
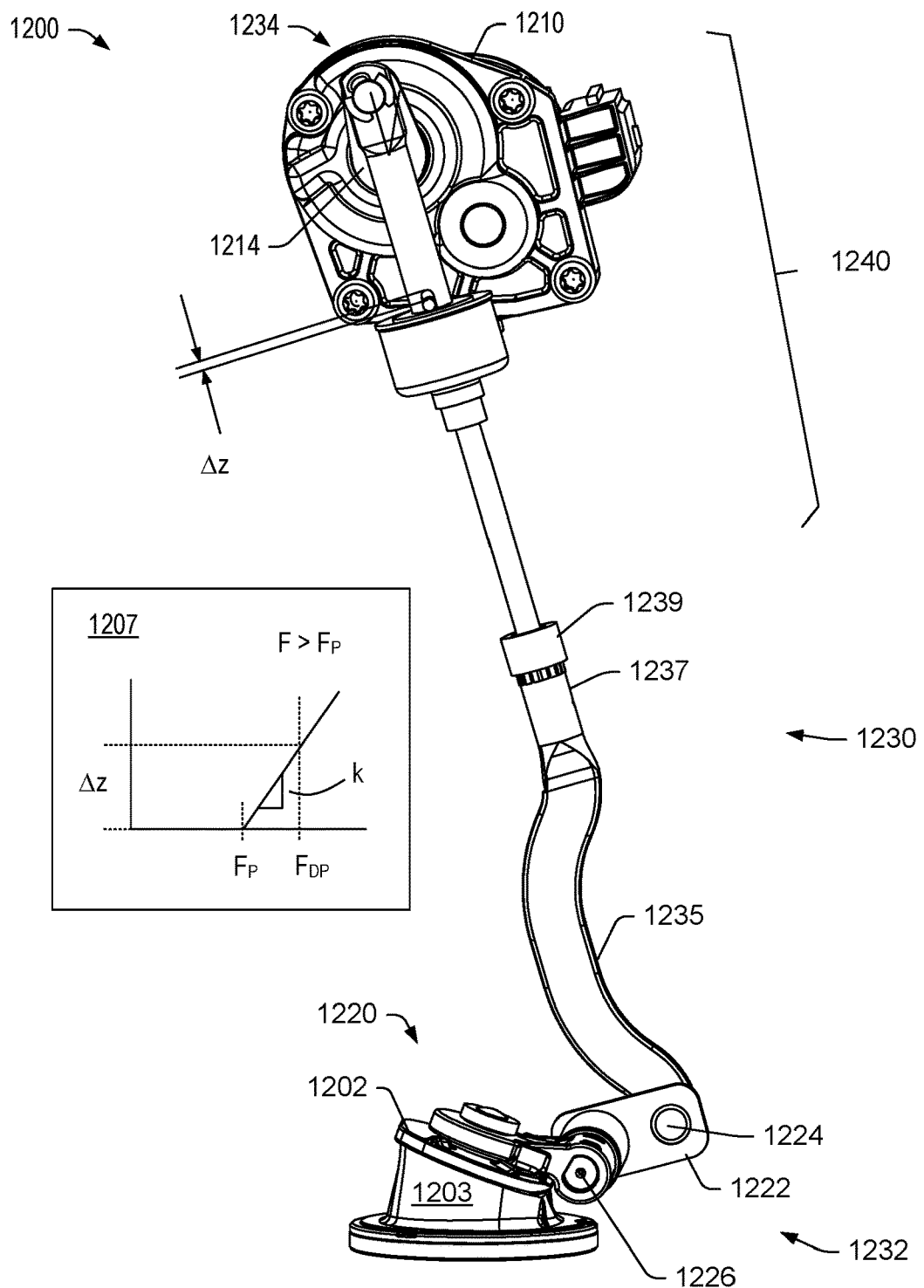
FIG. 12 shows an example of an assembly and an example plot.

FIG. 12 shows an example of an assembly 1200 as in the dead-point state 1106 of FIG. 11. In the example of FIG. 12, an actuator 1210 can control a bypass valve 1220 where a linkage assembly 1230 is utilized as part of a control mechanism that connects the actuator 1210 and the bypass valve 1220. FIG. 12 also shows a plot 1207 (see, e.g., the plot 1107 of FIG. 11).

As shown in the example of FIG. 12, the linkage assembly 1230 includes a valve end 1232 and an actuator end 1234 where a linkage 1222 (e.g., a bar) includes a peg 1224 operatively coupled to or part of the linkage assembly 1230 and where the linkage 1222 includes an opening or peg 1226 operatively coupled to the bypass valve 1220 (e.g., as a rotatable shaft of the bypass valve 1220 or operatively coupled to a rotatable shaft of the bypass valve 1220).

In the example of FIG. 12, the linkage assembly 1230 includes an extension 1235 with a relatively straight, axial portion 1237 and a connector 1239. As shown, the linkage assembly 1230 includes a spring-biased linkage 1240 that has an axial span from the connector 1239 to the actuator end 1234 of the linkage assembly 1230.

FIG. 12 also shows the actuator 1210 as including a rotatable shaft operatively coupled to a linkage 1214 that is operatively coupled to the actuator end 1234 of the linkage assembly 1230. For example, the actuator 1210 can be an electric actuator that includes a stator and a rotor driven by electrical power to rotate the rotor, which may be a rotatable shaft.

In the example of FIG. 12, the linkage 1214 can rotate clockwise and counter-clockwise via rotation of a rotatable shaft of the actuator 1210 and the actuator end 1234 can include, for example, an opening or a peg that is operatively coupled to the linkage 1214. Such a coupling can allow for a peg to rotate in an opening and/or an opening to rotate about a peg while the actuator end 1234 can sweep an arc over a radius of the linkage 1214. As an example, a clip (e.g., a C-clip), a pin or other component may be included to secure the actuator end 1234 with respect to the linkage 1214.

As mentioned, a four bar linkage approach can be utilized as part of a valve control mechanism. In such an example, a spring-biased linkage can be included such as, for example, the spring-biased linkage 1240 of FIG. 12.

FIG. 12 shows the assembly 1200 as including a valve plug 1202, a valve seat 1203, the peg 1226 as a rotatable shaft that can rotate in a bore of a housing to cause the valve plug 1202 to move toward the valve seat 1203 and contact the valve seat 1203 and to move away from the valve seat 1203. Example states of the bypass valve 1220 can include an open state, a closed state and a locked state that is a closed and locked state. In the closed and locked state, the electric actuator 1210 may consume little energy (e.g., parasitic consumption or vampire consumption) as the assembly can be maintained in the closed and locked state via mechanics including spring-biasing.

As an example, various components of the assembly 1200 can be made of metal and/or an alloy (e.g., a metallic material). As an example, consider a carbon steel, a stainless steel or another type of material that can withstand operational temperatures and that can provide suitable material properties.

As an example, a load may be applied by a spring-biased linkage of a multibar linkage that maintains a bypass valve in a closed position which may correspond to a hard-stop state. As an example, an actuator may transition such a multibar linkage from the hard-stop state to a dead-point state (e.g., a center point state) via actuator torque applied via rotation of a shaft in a direction such that the bypass valve is in a closed position, which may be then transitioned to an open position via further rotation of the shaft in the same direction.

As an example, an assembly for an exhaust bypass valve of a two-stage turbocharger can include a first turbocharger stage; a second turbocharger stage; an exhaust bypass valve that includes an open state and a closed state; an actuator; and a linkage mechanism that links the exhaust bypass valve to the actuator where the linkage mechanism includes a spring-biased linkage with a preset load where, in the closed state of the exhaust bypass valve, an axial length of the spring-biased linkage increases responsive to application of a load by the actuator that exceeds the preset load. In such an example, the exhaust bypass valve can include a closed and locked state. In such an example, in an orientation between the closed state and the closed and locked state, the spring-biased linkage can be at a maximum axial length. As an example, in the closed and locked state the spring-biased linkage can apply a locking force.

As an example, a spring-biased linkage can include a housing and a rod fixed to the housing and a spring-biased rod translatable with respect to the housing. In such an example, the housing can define a chamber where at least one cone washer is disposed in the chamber.

As an example, a spring-biased linkage can include a first housing axially translatable with respect to a second housing, a rod fixed to the first housing and a rod fixed to the second housing. In such an example, the first housing and the second housing can define a chamber where at least one cone washer is disposed in the chamber.

As an example, an assembly for an exhaust bypass valve of a two-stage turbocharger can include a first turbocharger stage; a second turbocharger stage; an exhaust bypass valve that includes an open state and a closed state; an actuator; and a linkage mechanism that links the exhaust bypass valve to the actuator where the linkage mechanism includes a spring-biased linkage with a preset load where, in the closed state of the exhaust bypass valve, an axial length of the spring-biased linkage increases responsive to application of a load by the actuator that exceeds the preset load and where the assembly can include at least one cone washer, which may determine, at least in part, the preset load. For example, a cone washer can be loaded by applying force to the cone washer that compresses the cone washer in an axial direction to diminish a cone height. In such an example, the cone washer may be characterized at least in part by a spring constant (e.g., k) where an amount of force (e.g., load) can be defined via an equation that depends on the spring constant. As an example, for a relatively small distance of axial compression of a cone washer, behavior of the cone washer may be substantially linear where force may be represented as, for example, $F=kz$, where z is in an axial direction of the cone shape of the cone washer. For a single cone washer, a relatively small distance associated with axial compression may be of the order of millimeters (e.g., less than about 10 mm, less than about 5 mm, of the order of several millimeters, etc.).

As an example, an assembly can include a plurality of cone washers. In such an example, the assembly may include at least one flat washer disposed axially between two of a plurality of cone washers. As an example, an assembly can include a plurality of cone washers that include at least two cone washers in series.

As an example, an assembly can include a spring-biased linkage that includes a load adjustment mechanism for setting the spring-biased linkage to a preset load, for example, where the load adjustment mechanism sets an axial distance between opposing rods of the spring-biased linkage. Such an axial distance can be associated with a compression state of one or more spring elements of a spring package of the spring-biased linkage. In such a state, the one or more spring elements can exert a force axially outwardly such that, where a force greater than the preload force is applied, further compression of the one or more spring elements can occur along with axial lengthening of the spring-biased linkage.

As an example, a spring-biased linkage can include a rod and at least one cone washer that includes an opening where the rod is disposed in the opening.

As an example, a spring-biased linkage can include a spring-biased rod that is translatable with respect to an axially fixed rod.

As an example, an assembly can include an electric actuator. For example, consider an electric actuator that includes an electric motor that includes a shaft that is operatively coupled to a linkage mechanism that includes a spring-biased linkage, which may include one or more cone washers.

As an example, an assembly can include an exhaust bypass valve that, in an open state, allows at least a portion of exhaust gas of an internal combustion engine to bypass one of a plurality of turbocharger stages. As an example, consider a first turbocharger stage that is a low exhaust gas flow stage and a second turbocharger stage that is a high exhaust gas flow stage.

As an example, an assembly, in an open state of an exhaust bypass valve, can include a path that exists for at least a portion of exhaust gas of an internal combustion engine to bypass a first turbocharger stage.

As an example, a method can include actuating an electric motor operatively coupled to a linkage mechanism of an exhaust bypass valve of a two-stage turbocharger where the linkage mechanism includes a spring-biased linkage with a preset load where an axial length of the spring-biased linkage increases responsive to application of a load that exceeds the preset load; and transitioning the bypass valve from a closed to a closed and locked state by applying a load that exceeds the preset load to increase the axial length of the spring-biased linkage and then decreasing the load to decrease the axial length of the spring-biased linkage. In such a method, an axial length of the spring-biased linkage increases responsive to application of a load that exceeds the preset load where exhaust bypass valve is in the closed state where a valve plug contacts a valve seat. Such a method may be implemented in controlling an exhaust bypass valve of a multi-stage turbocharger system. As an example, such a method can include reducing power consumption of the electric motor, for example, by positioning the linkage mechanism in a particular state, which may be maintained at least in part via the spring-biased linkage (e.g., a dead-point state, which may be associated with a closed and locked state of the exhaust bypass valve).

As an example, an assembly for an exhaust bypass valve of a two-stage turbocharger can include a first turbocharger stage; a second turbocharger stage; an exhaust bypass valve that includes an open state and a closed state; and a linkage mechanism that links the exhaust bypass valve to an actuator where the linkage mechanism includes a locked state for the closed state of the exhaust bypass valve. In such an example, the linkage mechanism can include at least one spring.

As an example, a linkage mechanism can include a zero point that corresponds to a closed state of an exhaust bypass valve (e.g., exhaust gas bypass valve) where in transitioning to a locked state, the linkage mechanism increases in length and then decreases in length. In such an example, transitioning to an unlocked state can include increasing length followed by decreasing length.

As an example, an exhaust bypass valve, in an open state, can allow at least a portion of exhaust gas of an internal combustion engine to bypass one of multiple turbocharger stages. As an example, a first turbocharger stage can be a low exhaust gas flow stage and a second turbocharger stage can be a high exhaust gas flow stage. As an example, in the open state of an exhaust bypass valve, a path can be opened for at least a portion of exhaust gas of an internal combustion engine to bypass a first turbocharger stage.

As an example, a method can include transitioning a linkage mechanism via an actuator to a closed and locked state with respect to a valve and, while in the locked state, reducing power supplied to the actuator. For example, the actuator can be an electrically powered actuator where a reduction in power supplied thereto can allow the actuator to cool or, for example, not generate heat energy due to supply of electrical power. As an example, a duty cycle for a linkage mechanism and actuator system of a vehicle may be predominantly in a closed and locked state such that power supplied to the actuator can be for portions of the duty cycle where, for example, opening of a valve is desired (e.g., an exhaust bypass valve of a turbocharger system).

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions without departing from the spirit set forth and defined by the following claims.

What is claimed is:

1. An assembly for an exhaust bypass valve of a two-stage turbocharger, the assembly comprising:
    a first turbocharger stage;
    a second turbocharger stage;
    an exhaust bypass valve that comprises an open state and a closed state;
    an actuator; and
    a linkage mechanism that links the exhaust bypass valve to the actuator wherein the linkage mechanism comprises a spring-biased linkage with a preset load in a compression state, a housing, at least one spring element disposed in the housing, and a load adjustment mechanism that comprises a component external to the housing, wherein an axial position of the component sets the spring-biased linkage to the preset load and sets an axial length of the housing, and wherein, in the closed state of the exhaust bypass valve, an axial length of the spring-biased linkage increases responsive to application of a load by the actuator that exceeds the preset load and the axial length of the housing decreases.

2. The assembly of claim 1 wherein the exhaust bypass valve comprises a closed and locked state.

3. The assembly of claim 2 wherein in an orientation between the closed state and the closed and locked state the spring-biased linkage is at a maximum axial length.

4. The assembly of claim 2 wherein in the closed and locked state the spring-biased linkage applies a locking force.

5. The assembly of claim 1 wherein the spring-biased linkage comprises a rod fixed to the housing and a spring-biased rod translatable with respect to the housing.

6. The assembly of claim 5 wherein the housing defines a chamber and wherein the at least one spring element comprises at least one cone washer that is disposed in the chamber.

7. The assembly of claim 1 wherein the housing comprises a first housing component axially translatable with respect to a second housing component.

8. The assembly of claim 7 wherein the first housing component and the second housing component define a chamber and wherein the at least one spring element comprises at least one cone washer that is disposed in the chamber.

9. The assembly of claim 1 wherein the at least one spring element comprises at least one cone washer.

10. The assembly of claim 9 comprising a plurality of cone washers.

11. The assembly of claim 9 comprising at least one flat washer disposed axially between two of a plurality of cone washers.

12. The assembly of claim 1 wherein the spring-biased linkage comprises opposing rods and wherein the component is a pin that is received in a cross-bore of one of the opposing rods.

13. The assembly of claim 1 wherein the spring-biased linkage comprises a rod and wherein the at least one spring element comprises at least one cone washer that comprises an opening wherein the rod is disposed in the opening.

14. The assembly of claim 1 wherein the spring-biased linkage comprises a spring-biased rod that is biased by the at least one spring element and that is translatable with respect to an axially fixed rod.

15. The assembly of claim 1 wherein the actuator comprises an electric actuator.

16. The assembly of claim 15 wherein the electric actuator comprises an electric motor that comprises a shaft that is operatively coupled to the linkage mechanism.

17. The assembly of claim 1 wherein the exhaust bypass valve, in the open state, allows at least a portion of exhaust gas of an internal combustion engine to bypass one of the turbocharger stages.

18. The assembly of claim 1 wherein the first turbocharger stage comprises a low exhaust gas flow stage and wherein the second turbocharger stage comprises a high exhaust gas flow stage.

19. The assembly of claim 1 wherein in the open state of the exhaust bypass valve, a path exists for at least a portion of exhaust gas of an internal combustion engine to bypass a first turbocharger stage.

20. A method comprising:

actuating an electric motor operatively coupled to a linkage mechanism of an exhaust bypass valve of a two-stage turbocharger wherein the linkage mechanism comprises a spring-biased linkage with a preset load in a compression state, a housing, at least one spring element disposed in the housing, and a load adjustment mechanism that comprises a component external to the housing, wherein an axial position of the component sets the spring-biased linkage to the preset load and sets an axial length of the housing, and wherein an axial length of the spring-biased linkage increases responsive to application of a load that exceeds the preset load and the axial length of the housing decreases; and transitioning the bypass valve from a closed to a closed and locked state by applying a load that exceeds the preset load to increase the axial length of the spring-biased linkage and decrease the axial length of the housing and then decreasing the load to decrease the axial length of the spring-biased linkage and increase the axial length of the housing.

* * * * *